United States Patent
Kawada et al.

(10) Patent No.: US 8,848,366 B2
(45) Date of Patent: Sep. 30, 2014

(54) HOLDING DEVICE AND ELECTRONIC DEVICE INCLUDING THE SAME

(75) Inventors: Yoshihiro Kawada, Osaka (JP); Toshiya Senoh, Nara (JP); Jun Sato, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 316 days.

(21) Appl. No.: 13/427,905

(22) Filed: Mar. 23, 2012

(65) Prior Publication Data

US 2012/0243152 A1    Sep. 27, 2012

(30) Foreign Application Priority Data

Mar. 25, 2011   (JP) .................. 2011-068206

(51) Int. Cl.
*G06F 1/16* (2006.01)

(52) U.S. Cl.
CPC ............ *G06F 1/1613* (2013.01); *G06F 1/1632* (2013.01)
USPC .................................................. 361/679.59

(58) Field of Classification Search
USPC .................................................... 361/679.59
See application file for complete search history.

(56) References Cited

U.S. PATENT DOCUMENTS

| | | | | |
|---|---|---|---|---|
| 4,951,241 | A * | 8/1990 | Hosoi et al. ............... | 361/679.09 |
| 5,235,495 | A * | 8/1993 | Blair et al. ................ | 361/679.26 |
| 5,293,300 | A * | 3/1994 | Leung ....................... | 361/679.59 |
| 5,351,508 | A * | 10/1994 | Kelley ............................. | 70/58 |
| 5,375,076 | A * | 12/1994 | Goodrich et al. ........ | 361/679.17 |
| 6,016,248 | A * | 1/2000 | Anzai et al. .............. | 361/679.59 |
| 6,017,106 | A * | 1/2000 | Adams et al. ............... | 312/223.2 |
| 6,208,504 | B1 * | 3/2001 | Cho et al. ................. | 361/679.59 |
| 7,206,198 | B2 * | 4/2007 | Wang ........................ | 361/679.55 |
| 7,576,981 | B2 * | 8/2009 | Kuo .......................... | 361/679.59 |
| 7,612,998 | B2 * | 11/2009 | Fan et al. ................. | 361/679.59 |
| 7,660,113 | B2 * | 2/2010 | Kaneko .................... | 361/679.59 |
| 7,894,189 | B2 * | 2/2011 | Lin ........................... | 361/679.59 |
| 7,898,796 | B2 * | 3/2011 | Horie ....................... | 361/679.02 |
| 7,916,478 | B2 * | 3/2011 | Tu et al. ................... | 361/679.59 |
| 7,936,562 | B2 * | 5/2011 | Nagamura et al. ....... | 361/679.59 |
| 7,948,753 | B2 * | 5/2011 | Wang ........................ | 361/679.59 |
| 8,081,429 | B2 * | 12/2011 | Horie ....................... | 361/679.02 |
| 8,111,512 | B2 * | 2/2012 | Yeh et al. ................. | 361/679.59 |
| 8,243,444 | B2 * | 8/2012 | Kawada et al. .......... | 361/679.59 |
| 8,400,767 | B2 * | 3/2013 | Yeom et al. .............. | 361/679.59 |
| 8,405,981 | B2 * | 3/2013 | Takemasa et al. ....... | 361/679.59 |

(Continued)

FOREIGN PATENT DOCUMENTS

| | | |
|---|---|---|
| JP | H06-289992 A | 10/1994 |
| JP | H08-087351 A | 4/1996 |
| JP | H10-091281 A | 4/1998 |
| JP | 2006-038923 A | 2/2006 |
| JP | 2007-033941 A | 2/2007 |

*Primary Examiner* — Lisa Lea Edmonds

(74) *Attorney, Agent, or Firm* — James W. Judge

(57) ABSTRACT

A holding device includes a plurality of holding sections each including a recess or an opening through which a hand of a user can be inserted; and a connection section connecting the plurality of holding sections to each other. When the holding device is fixed to two surfaces of an electronic device which are adjacent to each other, a handle that can be held by the user with a hand and a grip belt that can be supported by the user with the hand can be connected to each other via the connection section. Thus, the number of parts can be reduced and management of parts is easy.

14 Claims, 26 Drawing Sheets

(56) References Cited

U.S. PATENT DOCUMENTS

| | | | |
|---|---|---|---|
| 2006/0050472 A1* | 3/2006 | Chen | 361/681 |
| 2006/0077623 A1* | 4/2006 | Yeh | 361/681 |
| 2006/0146487 A1* | 7/2006 | Huang | 361/681 |
| 2007/0076362 A1* | 4/2007 | Lagnado | 361/683 |
| 2007/0139874 A1* | 6/2007 | Tanaka | 361/683 |
| 2010/0027218 A1* | 2/2010 | Lin et al. | 361/679.59 |
| 2010/0046154 A1* | 2/2010 | Nagamura et al. | 361/679.21 |
| 2010/0046166 A1* | 2/2010 | Tanaka et al. | 361/679.59 |
| 2012/0044624 A1* | 2/2012 | Hoffman et al. | 361/679.21 |

* cited by examiner

US 8,848,366 B2

HOLDING DEVICE AND ELECTRONIC DEVICE INCLUDING THE SAME

BACKGROUND OF THE INVENTION

1. Field of the Invention

The disclosure of the present application relates to a holding device including a hand grip and a grip belt. In addition, the disclosure of the present application relates to an electronic device including the holding device.

2. Description of the Background Art

In recent years, as laptop personal computers (hereinafter, referred to as laptop PCs) and tablet personal computers (hereinafter, referred to as tablet PCs), PCs equipped with hand grips that are held by users with hands such that the PCs are easily carried have appeared. In addition, as recent laptop PCs and tablet PCs, PCs equipped with grip belts in order for users to be able to operate the PCs while holding the grip belts have appeared.

Japanese Laid-Open Patent Publication No. 8-87351 discloses a computer carrying case equipped with a handle that serves as a hand grip. Japanese Laid-Open Patent Publication No. 10-91281 discloses a computer equipped with a handle that serves as a grip belt. Japanese Laid-Open Patent Publication No. 6-289992 discloses a computer equipped with a belt that serves as a grip belt.

However, in the configurations disclosed in Japanese Laid-Open Patent Publication Nos. 8-87351, 10-91281, and 6-289992, when a hand grip and a grip belt are mounted on a laptop PC or the like, components for the hand grip and the grip belt have to be independently molded and produced, and thus the manufacturing cost such as the cost of molds increases. In addition, when the hand grip and the grip belt are mounted on the laptop PC or the like, each of the hand grip and the grip belt has to be accurately positioned with respect to the laptop PC, and this deteriorates the assembling workability.

SUMMARY OF THE INVENTION

A holding device disclosed in the present application includes: a plurality of holding sections each including a recess or an opening through which a hand of a user can be inserted; and a connection section connecting the plurality of holding sections to each other.

An electronic device disclosed in the present application includes a housing and a display section disposed in a first surface of the housing and capable of displaying a video image. A holding device is fixed to the housing. The holding device includes: a plurality of holding sections each including a recess or an opening through which a hand of a user can be inserted; and a connection section connecting the plurality of holding sections to each other.

According to the disclosure of the present application, a hand grip and a grip belt can be mounted with a simple and low-cost configuration.

DESCRIPTION OF THE PREFERRED EMBODIMENTS

Embodiment 1

[1. Schematic Configurations of Electronic Device and Holding Device]

Figure 1:
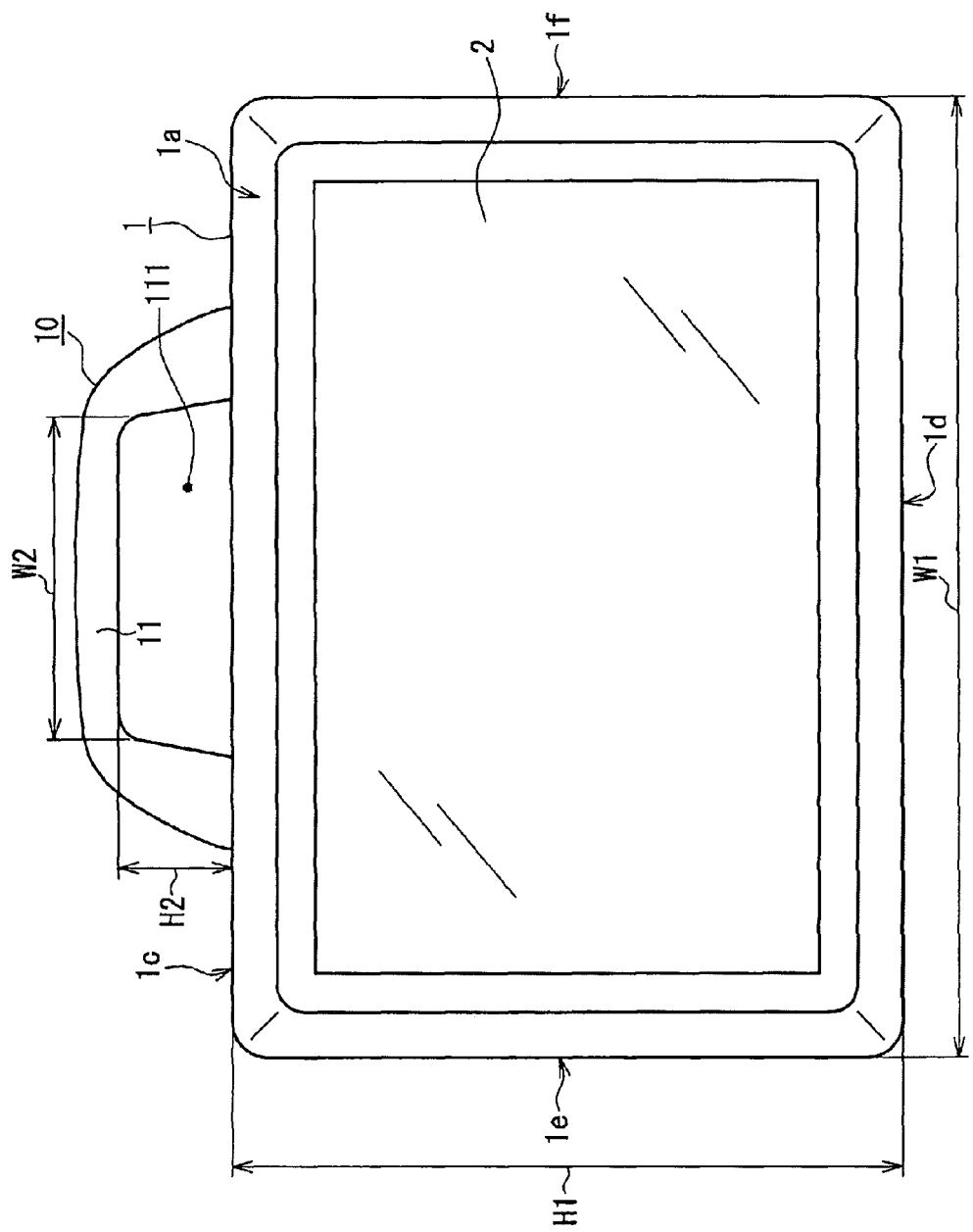
FIG. 1 is a front view of an electronic device including a holding device according to an embodiment.
Figure 2:
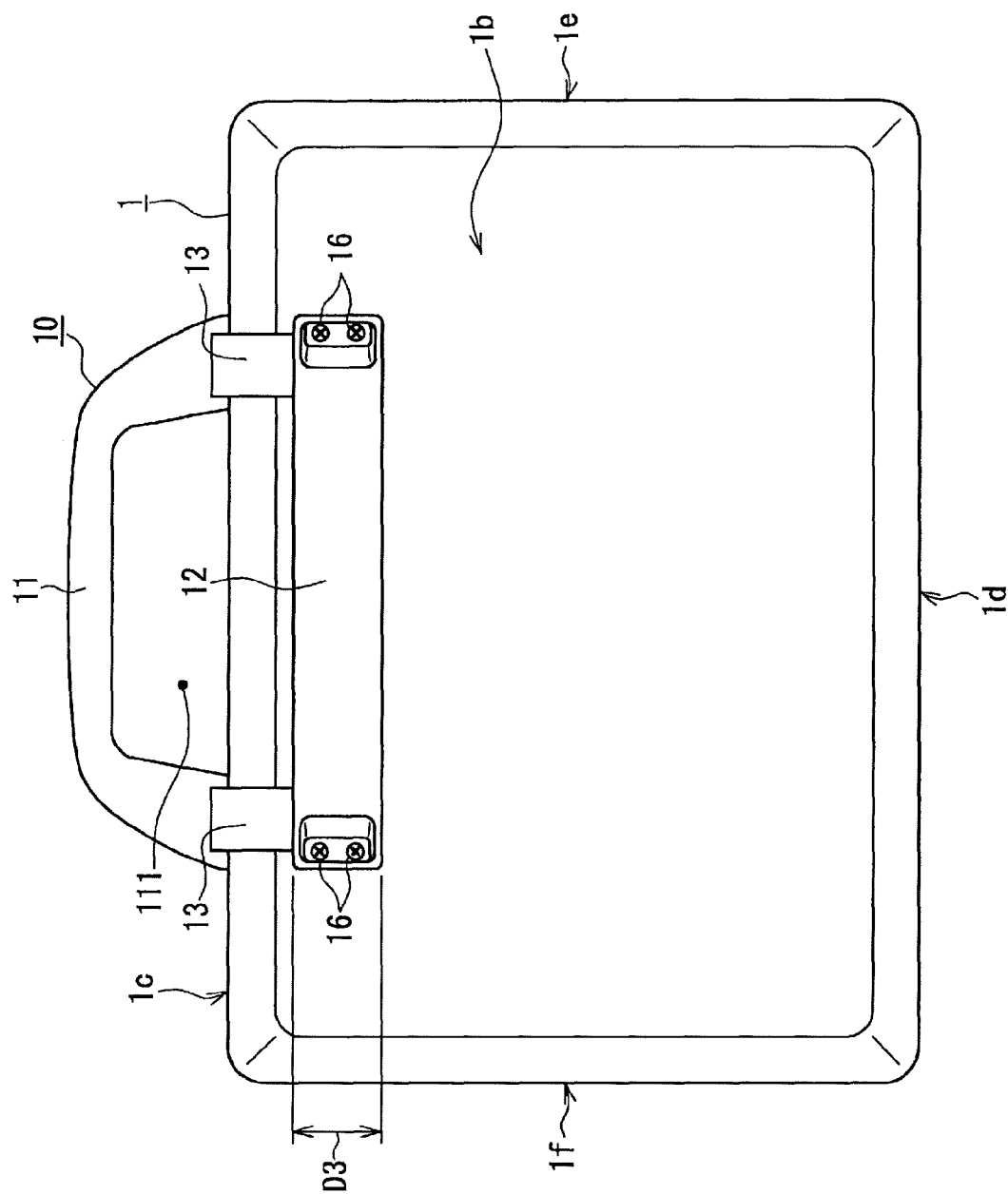
FIG. 2 is a rear view of the electronic device including the holding device according to the embodiment.
Figure 3:
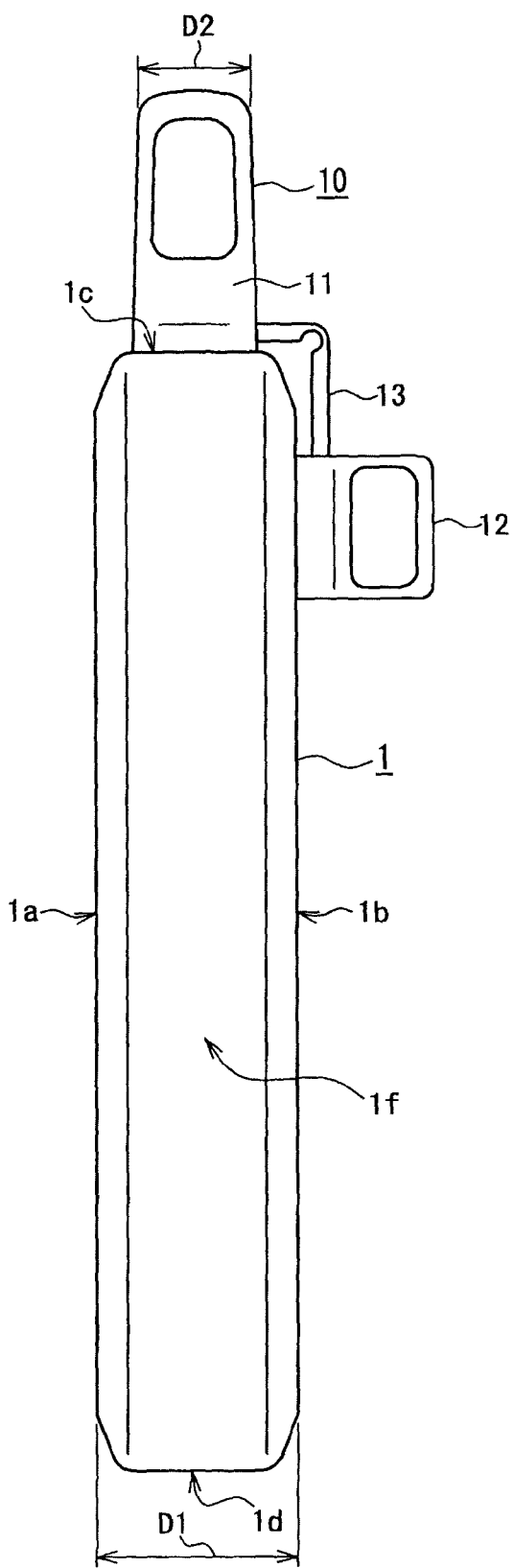
FIG. 3 is a side view of the electronic device including the holding device according to the embodiment.
Figure 4:
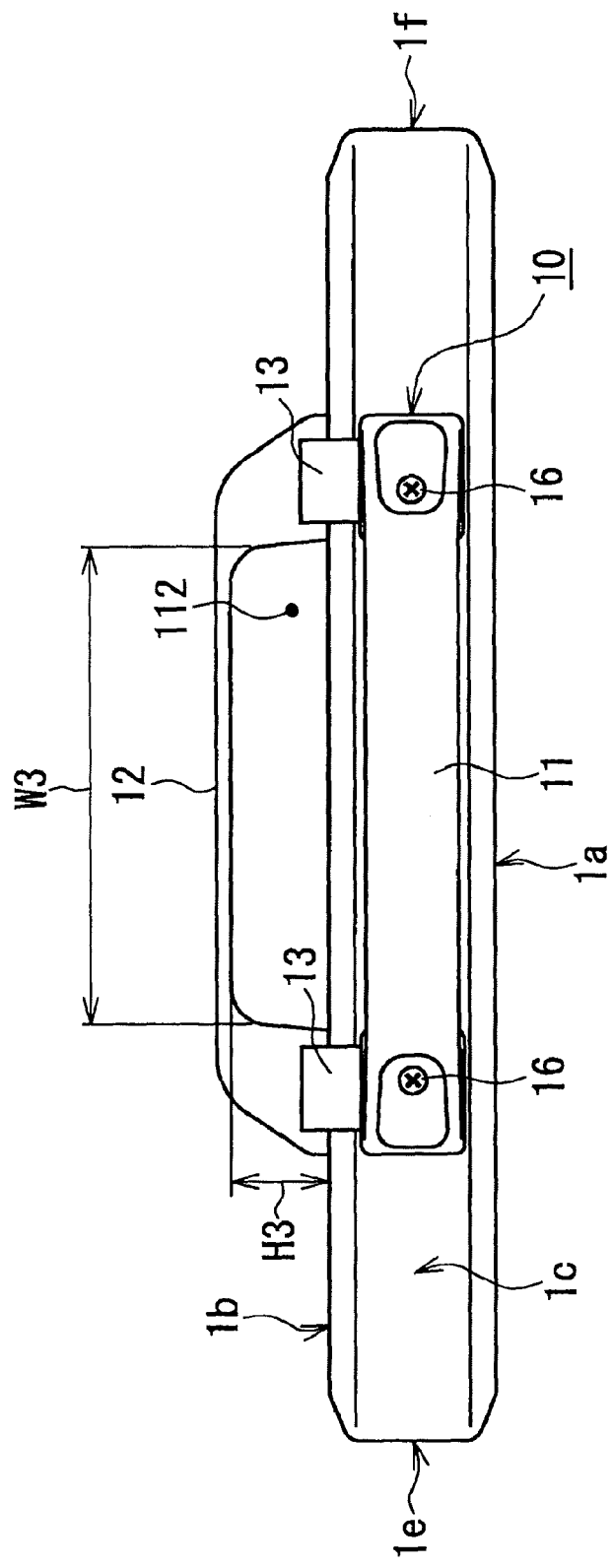
FIG. 4 is a top view of the electronic device including the holding device according to the embodiment.

FIG. 1 is a front view of a computer device 1 including a holding member 10 according to the present embodiment. FIG. 2 is a rear view of the computer device 1 including the holding member 10 according to the present embodiment. FIG. 3 is a side view of the computer device 1 including the holding member 10 according to the present embodiment. FIG. 4 is a top view of the computer device 1 including the holding member 10 according to the present embodiment. The computer device 1 is an example of an electronic device. The holding member 10 is an example of a holding device. As an electronic device according to the present embodiment, the portable computer device 1 including a single housing is taken as an example. However, the electronic device according to the present embodiment may be an electronic device other than the computer device as long as it is an electronic device that can be at least held and carried or operated by a user, and is not limited to one including a single housing as described later.

In the computer device 1, the outer edge thereof is covered with a substantially parallelepiped-shaped housing having a front surface 1a, a back surface 1b, a top surface 1c, a bottom surface 1d, a side surface 1e, and a side surface 1f. The computer device 1 is preferably sized so as to be able to be held by a user with one hand, and can be sized to have, for example, a height dimension H1 of about 20 cm, a width dimension W1 of about 30 cm, and a depth dimension D1 of about 3 cm. It should be noted that the above dimensions of the computer device 1 are examples. In the computer device 1, electronic components such as a central processing unit (CPU) and a storage medium are disposed within the housing. The computer device 1 includes a display panel 2 in the front surface 1a. The display panel 2 is capable of displaying various video images, and can be configured, for example, as a liquid crystal display panel. The display panel 2 may include a touch panel that can detect touch with a finger, a stylus pen, or the like.

Screw holes (described later) into which screws 16 (see FIG. 4) for fixing a hand grip 11 are screwed are formed in the top surface 1c of the computer device 1. In addition, screw holes (described later) into which screws 16 (see FIG. 2) for fixing a grip belt 12 are screwed are formed in the back surface 1b of the computer device 1.

The holding member 10 includes the hand grip 11, the grip belt 12, and a connection section 13. The hand grip 11 is fixed to the top surface 1c of the computer device 1. The hand grip 11 is formed in a substantially "C" shape. Thus, in a state where the hand grip 11 is fixed to the top surface 1c of the computer device 1, a void 111 is formed between the hand grip 11 and the computer device 1. The void 111 has a width dimension W2, a height dimension H2, and a depth dimension D2 which are set such that a hand (e.g., a second finger, a third finger, a fourth finger, and a fifth finger) of the user can be inserted through the void 111. The grip belt 12 is fixed to the back surface 1b of the computer device 1. The grip belt 12 is formed in a substantially "C" shape. Thus, in a state where the grip belt 12 is fixed to the back surface 1b of the computer device 1, a void 112 is formed between the grip belt 12 and the computer device 1. The void 112 has a width dimension W3, a height dimension H3, and a depth dimension D3 which are set such that a hand of the user can be inserted through the void 112. The connection section 13 connects the hand grip 11 to the grip belt 12. The connection section 13 is bent or deformed in a curved manner in a state where the hand grip 11 is fixed to the top surface 1c of the computer device 1 and the grip belt 12 is fixed to the back surface 1b of the computer device 1.

[2. Specific Configuration of Holding Member 10]

Figure 5:
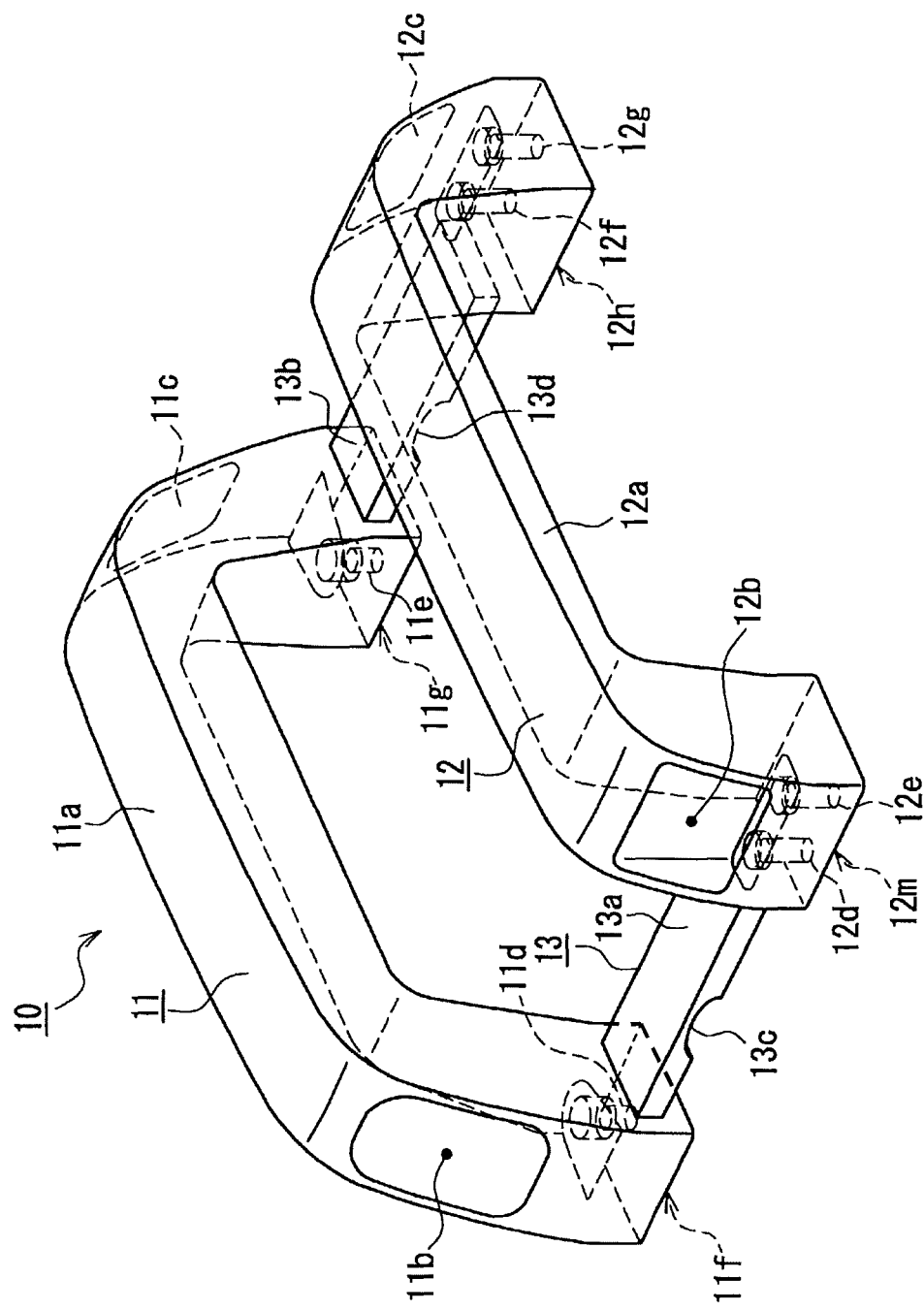
FIG. 5 is a perspective view of the holding device according to the embodiment.

FIG. 5 is a perspective view of the holding member 10.

The holding member 10 is configured by integrally connecting the hand grip 11, the grip belt 12, and the connection section 13 to each other. The holding member 10 is preferably formed from a flexible material that expands, contracts, or deforms in a contracting manner and has resilience to return from the expansion or contraction to the original shape (hereinafter, referred to as elastically deformable), and is formed from silicone rubber as an example in the present embodiment. It should be noted that the holding member 10 is integrally formed from a single material in the present embodiment, but the hand grip 11, the grip belt 12, and the connection section 13 may be formed from different materials, respectively.

The hand grip 11 includes a holding portion 11a, a recess 11b, a recess 11c, a hole 11d, and a hole 11e. The holding portion 11a is a site that is held by the user with a hand. In a state where the hand grip 11 is fixed to the top surface 1c of the computer device 1, the holding portion 11a is disposed so as to face the top surface 1c of the computer device 1 across the void 111 (see FIG. 1). In order to make it easy for the user to hold the holding portion 11a and in order to ensure rigidity, preferably, the holding portion 11a has a cross-sectional shape that is circular, elliptical, semi-circular, or semi-elliptical, and also has projections and recesses that correspond to the shape of the fingers and a hand of the user. The recess 11b is formed on an end side of the holding portion 11a in its longitudinal direction. The recess 11c is formed on another end side of the holding portion 11a in the longitudinal direction. Each of the recesses 11b and 11c is sized such that a hand grip protection member 14 (described later) can be fitted therein. The hole 11d is formed in the recess 11b so as to extend to a bottom surface 11f. The hole 11e is formed in the recess 11c so as to extend to a bottom surface 11g. The bottom surfaces 11f and 11g are surfaces that are in contact with the top surface 1c in a state where the hand grip 11 is fixed to the top surface 1c of the computer device 1.

The grip belt 12 includes a belt portion 12a, a recess 12b, a recess 12c, and holes 12d to 12g. In a state where the grip belt 12 is fixed to the back surface 1b of the computer device 1, the belt portion 12a is disposed so as to face the back surface 1b of the computer device 1 across the void 112 (see FIG. 4). In a state where a hand of the user is inserted through the void 112 (see FIG. 4), the belt portion 12a faces the back of the hand of the user across a gap or is in contact with the back of the hand of the user. In order to ensure flexibility, the belt portion 12a is preferably formed so as to be thin. When the belt portion 12a is formed so as to be thin, the belt portion 12a is in contact with the back of the hand of the user inserted through the void 112 (see FIG. 4), such that the belt portion 12a is elastically deformable. Thus, the hand of the user is easily and favorably fitted to the belt portion 12a. The recess 12b is formed on an end side of the belt portion 12a in its longitudinal direction. The recess 12c is formed on the other end side of the belt portion 12a in the longitudinal direction. Each of the recesses 12b and 12c is sized such that a grip belt protection member 15 can be fitted therein. The holes 12d and 12e are formed in the recess 12b so as to extend to a bottom surface 12m. The holes 12f and 12g are formed in the recess 12c so as to extend to a bottom surface 12h. The bottom surfaces 12m and 12h are surfaces that are in contact with the back surface 1b in a state where the grip belt 12 is fixed to the back surface 1b of the computer device 1.

The connection section 13 includes a first connection portion 13a and a second connection portion 13b. The first connection portion 13a is integrally connected at an end thereof to an end portion of the hand grip 11 in the longitudinal direction, and is integrally connected at another end thereof to an end portion of the grip belt 12 in the longitudinal direction. The second connection portion 13b is integrally connected at an end thereof to another end portion of the hand grip 11 in the longitudinal direction, and is integrally connected at another end thereof to another end portion of the grip belt 12 in the longitudinal direction. The first connection portion 13a is formed with a thin portion 13c. The second connection portion 13b is formed with a thin portion 13d. The thin portions 13c and 13d are formed so as to be thinner than the other sites in the first connection portion 13a and the second connection portion 13b. Since the connection section 13 includes the thin portions 13c and 13d, compressive force and tension that occur when the connection section 13 is bent can be reduced as compared to those in a connection section that does not include any thin portion. Thus, damage such as cracking is unlikely to occur in the connection section 13.

Figure 6:
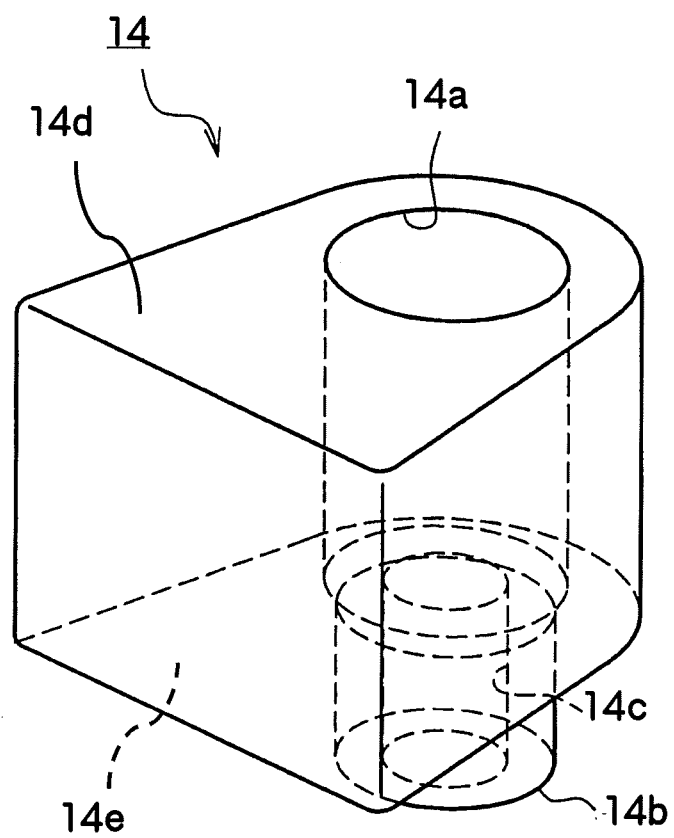
FIG. 6 is a perspective view of a hand grip protection member.

FIG. 6 is a perspective view of the hand grip protection member 14. The hand grip protection member 14 is formed in a columnar shape having an end surface 14d which includes a hole 14a and whose outer shape has two corners and one circular arc. The hand grip protection member 14 is formed from a material harder than the hand grip 11, and is formed from polyacetal resin as an example in the present embodiment. The hand grip protection member 14 is a member for protecting the hand grip 11 from a head of a screw (described later) when the hand grip 11 is fixed to the computer device 1 by means of screws (described later). In the hand grip protection member 14, the end surface 14d including the hole 14a and a projection 14b that is located on an end surface 14e opposite to the end surface 14d and has a hole 14c therein are formed. It should be noted that the hand grip protection member 14 suffices to at least have such a shape that the hand grip protection member 14 does not rotate within the recess 11b or 11c when the hand grip protection member 14 is fitted in the recess 11b or 11c of the hand grip 11, and may have a shape other than the shapes of the end surfaces 14d and 14e. With such a configuration, it is easy to tighten the screw (described later) and loosening of the screw in the hand grip protection member 14 can be prevented.

The hole 14a has an inner diameter that allows at least the head of the screw (described later) to be inserted therethrough. The projection 14b is formed in a cylindrical shape. The projection 14b has an outer diameter that allows the projection 14b to be fitted in the hole 11d or 11e formed in the grip belt 11. The hole 14c is formed so as to extend through the projection 14b. The hole 14c has an inner diameter that is at least larger than the outer diameter of an external thread portion of the screw (described later) and smaller than the outer diameter of the head of the screw (described later). The hole 14a and the hole 14c are concentric with each other and provided so as to be connected to each other.

Figure 7:
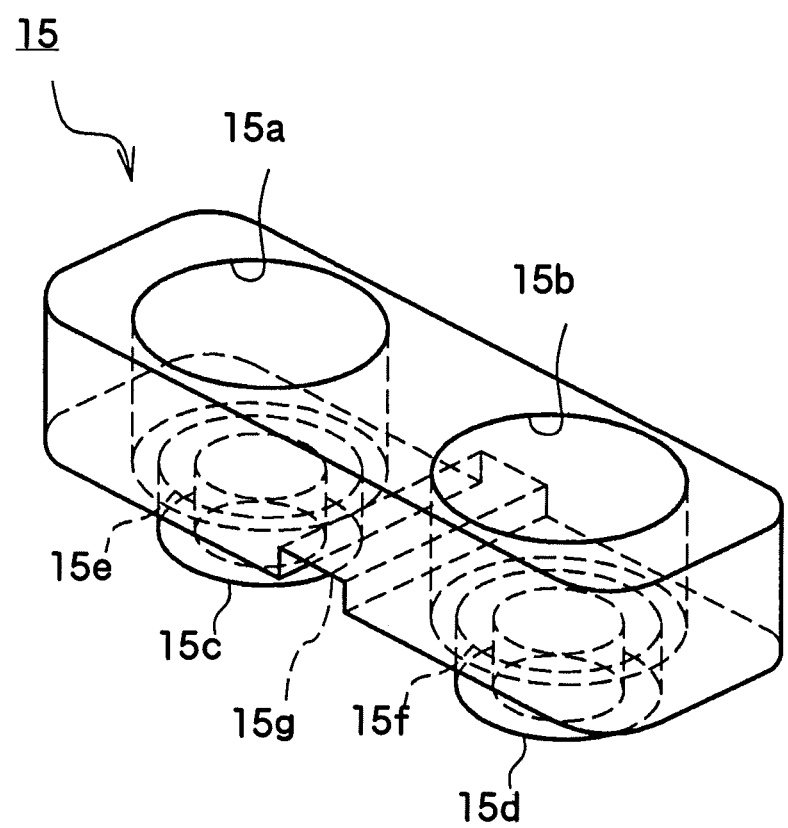
FIG. 7 is a perspective view of a grip belt protection member.

FIG. 7 is a perspective view of the grip belt protection member 15. The grip belt protection member 15 is basically formed in a rectangular-columnar shape. The grip belt protection member 15 is formed from a material harder than the grip belt 12, and is formed from polyacetal resin as an example in the present embodiment. The grip belt protection member 15 is a member for protecting the grip belt 12 from heads of screws (described later) when the grip belt 12 is fixed to the computer device 1 by means of screws (described later). In the grip belt protection member 15, a hole 15a, a hole 15b, a projection 15c, a projection 15d, a hole 15e, and a hole 15f are formed. It should be noted that the grip belt protection member 15 suffices to have such a shape that the grip belt protection member 15 does not rotate within the recess 12b or 12c when screwing the screws (described later) in a state where the grip belt protection member 15 is fitted in the recess 12b or 12c of the grip belt 12. With such a configuration, it is easy to tighten the screws (described later) and loosening of the screws in the grip belt protection member 15 can be prevented.

The holes 15a and 15b have inner diameters that allow at least the heads of the screws (described later) to be inserted through. The projections 15c and 15d are formed in cylindrical shapes. As described later, the grip belt protection member 15 is configured to be fitted in both the holes 12b and 12c, and thus the projections 15c and 15d have outer diameters that allow the projections 15c and 15d to be fitted in the holes 12d to 12g formed in the hand grip 12. The holes 15e and 15f are formed so as to extend through the projections 15c and 15d, respectively. The holes 15e and 15f have inner diameters that are at least larger than the outer diameters of external thread portions of the screws (described later) and smaller than the outer diameters of the heads of the screws (described later). The hole 15a and the hole 15e are concentric with each other and provided so as to be connected to each other. The hole 15b and the hole 15f are concentric with each other and provided so as to be connected to each other.

[3. Method for Mounting Holding Member 10]

Figure 8:
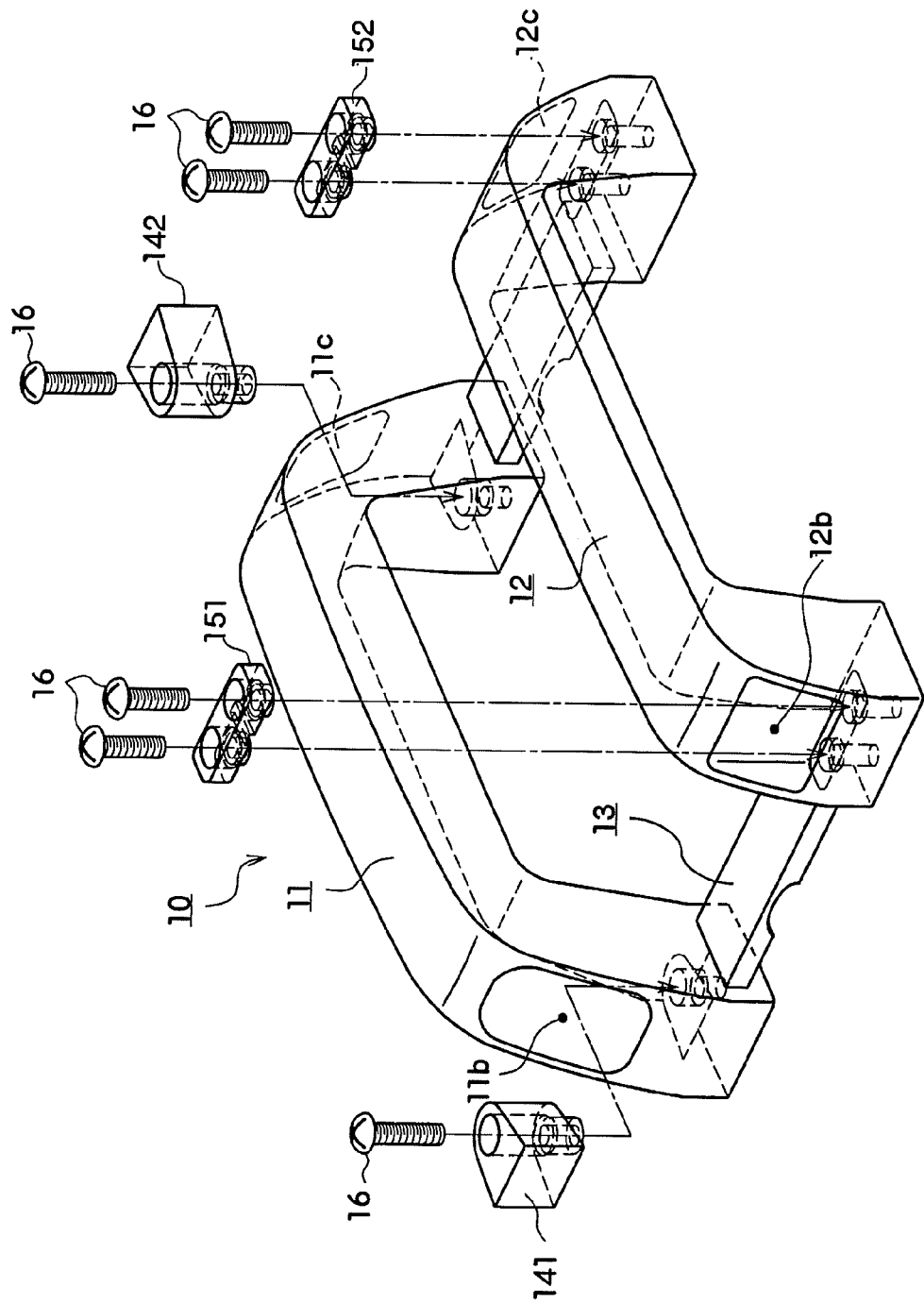
FIG. 8 is an exploded perspective view of the holding device.
Figure 9A:
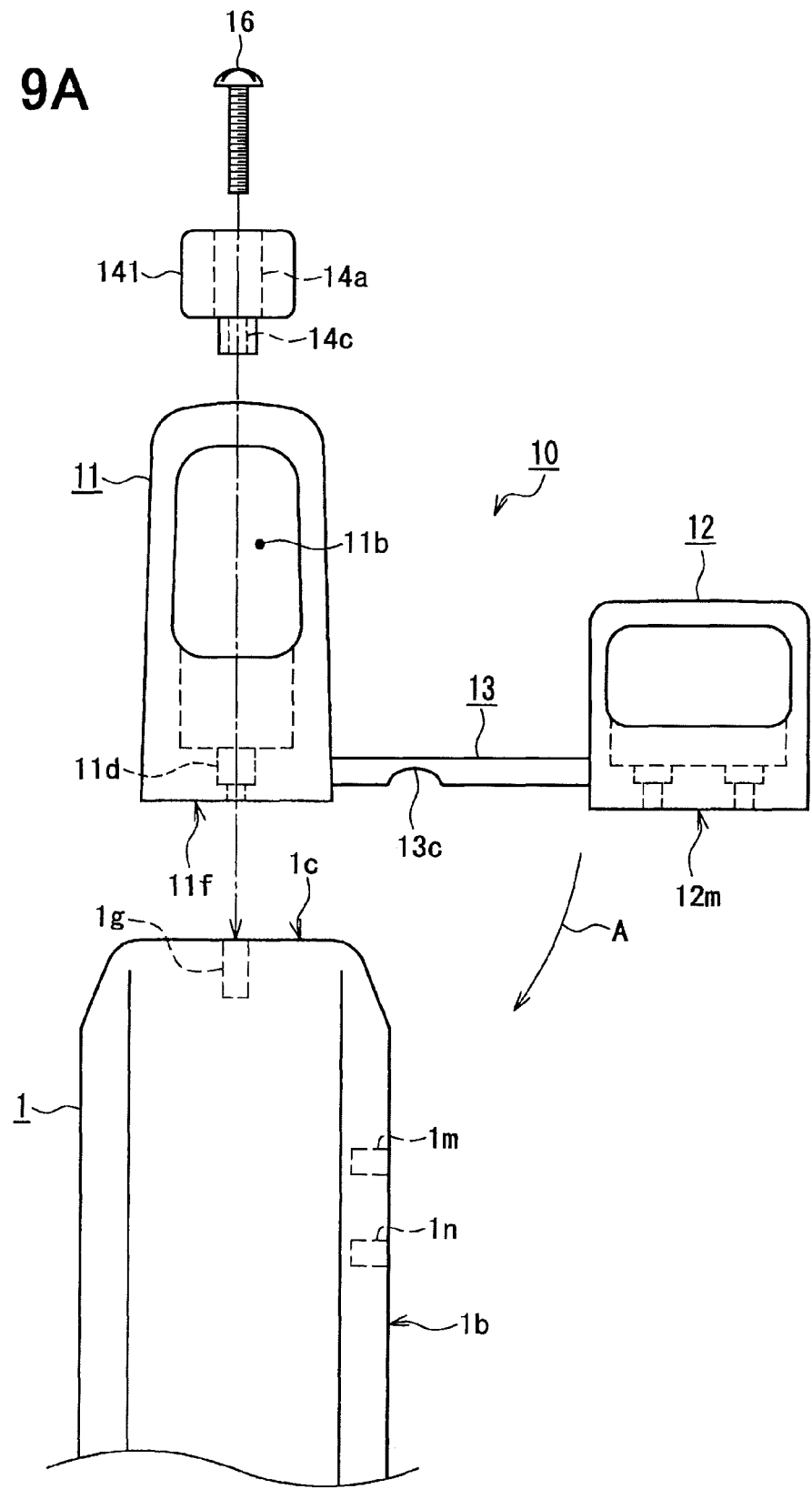
FIG. 9A is an exploded side view of the holding device.
Figure 9B:
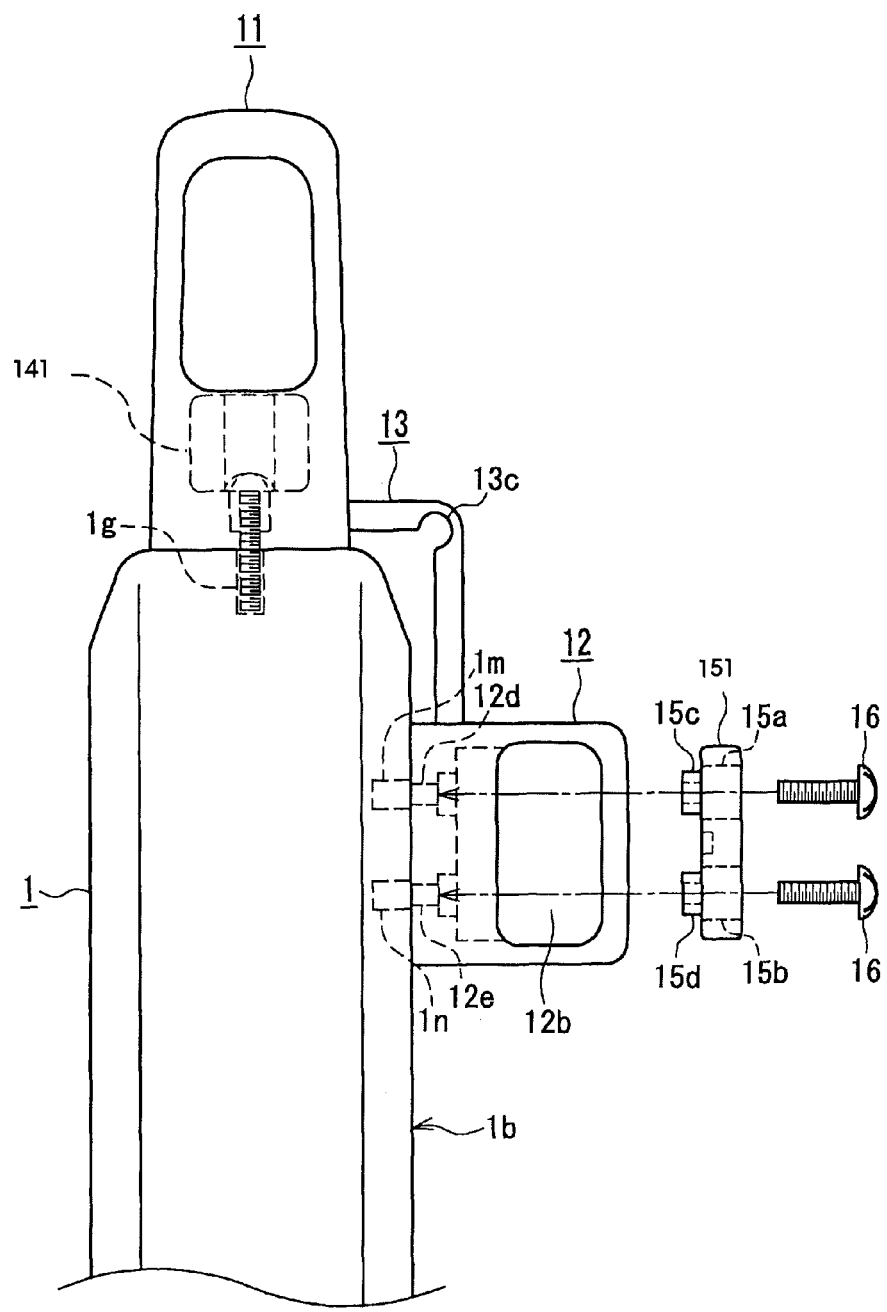
FIG. 9B is an exploded side view of the holding device.
Figure 9C:
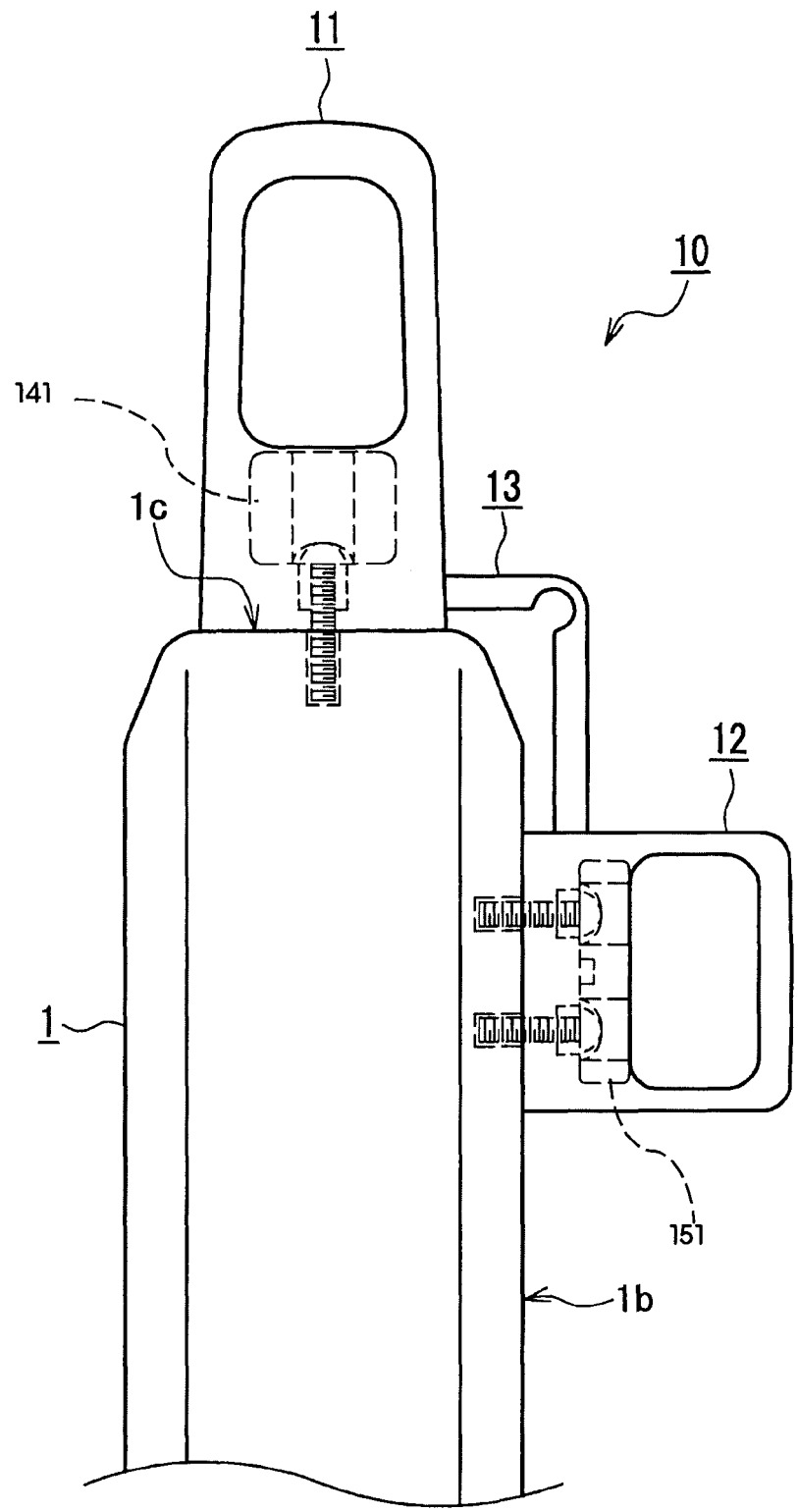
FIG. 9C is an exploded side view of the holding device.

FIG. 8 is an exploded perspective view of the holding member 10 including the hand grip protection member 14, the grip belt protection member 15, the connection section 13, and the screws 16. FIGS. 9A, 9B, and 9C are side views showing transition when the holding member 10 is mounted onto the computer device 1. It should be noted that each of hand grip protection members 141 and 142 shown in FIGS. 8, 9A, 9B, and 9C is the same as the hand grip protection member 14 shown in FIG. 6. In addition, each of grip belt protection members 151 and 152 shown in FIGS. 8, 9B, and 9C is the same as the grip belt protection member 15 shown in FIG. 7.

First, as shown in FIG. 8, the hand grip protection member 141 is fitted into the recess 11b of the hand grip 11, and the hand grip protection member 142 is fitted into the recess 11c of the hand grip 11. When fitting, a projection (the projection 14b shown in FIG. 6) provided in the hand grip protection member 141 is fitted into the holes 11d provided in the hand grip 11. It should be noted that the hand grip protection members 141 and 142 have the configuration shown in FIG. 6 and are the same in shape. Thus, the hand grip protection member 141 can be fitted also into the recess 11c of the hand grip 11.

Next, as shown in FIG. 9A, the hand grip 11 is fixed to the top surface 1c of the computer device 1 by means of the screws 16. Specifically, the bottom surfaces 11f and 11g of the hand grip 11 in which the hand grip protection members 141 and 142 are fitted are brought into contact with the top surface 1c of the computer device 1. At that time, the hole 11d of the hand grip 11, the hole 14c of the hand grip protection member 141, and a screw hole 1g of the computer device 1 are positioned so as to correspond to each other. In addition, the hole 11e of the hand grip 11, the hole 14c of the hand grip protection member 142, and another screw hole (not shown) of the computer device 1 are positioned so as to correspond to each other. Next, a screw 16 is inserted through the holes 14a and 14c of the hand grip protection member 141 and screwed into the screw hole 1g. Moreover, another screw 16 is inserted through the holes 14a and 14c of the hand grip protection member 142 and screwed into the other screw hole (not shown). By so doing, the hand grip 11 can be fixed to the top surface 1c of the computer device 1.

Next, as shown in FIG. 8, the grip belt protection member 151 is fitted into the recess 12b of the grip belt 12, and the grip belt protection member 152 is fitted into the recess 12c of the grip belt 12. When fitting, projections (the projections 15c and 15d shown in FIG. 7) provided in the grip belt protection member 151 are fitted into the holes 12d and 12e provided in the grip belt 12. In addition, projections (the projections 15c and 15d shown in FIG. 7) provided in the grip belt protection member 152 are fitted into the holes 12f and 12g provided in the grip belt 12. It should be noted that the grip belt protection members 151 and 152 have the configuration shown in FIG. 7 and are the same in shape. Thus, the grip belt protection member 151 can be fitted also into the recess 12c of the grip belt 12. In addition, the grip belt protection members 151 and 152 have long and thin rectangular-columnar shapes as their outer shapes. Thus, the grip belt protection members 151 and 152 do not rotate within the recesses 12b and 12c provided in the grip belt 12, and the screwed relation between the screws 16 and screw holes 1m and 1n is not deteriorated. Moreover, the grip belt protection members 151 and 152 each have a groove 15g (see FIG. 7) in an opposite surface in a direction from which the screws 16 are screwed. Thus, the grooves 15g allow the grip belt protection members 151 and 152 to be fitted to the grip belt 12 within the recesses 12b and 12c, and screw connection with the screws 16 can be assuredly performed.

Next, as shown in FIG. 9B, the grip belt 12 is fixed to the back surface 1b of the computer device 1 by means of the screws 16. Specifically, the bottom surfaces 12m and 12h of the grip belt 12 in which the grip belt protection members 151 and 152 are fitted are brought into contact with the back surface 1b of the computer device 1. At that time, in the holding member 10, the grip belt 12 is displaced from the state shown in FIG. 9A in a direction indicated by an arrow A while the connection section 13 is deformed in a curved manner in the direction indicated by the arrow A. When being deformed in a curved manner, the connection section 13 can be deformed preferentially at the thin portion 13c. In addition, the holes 12d and 12e (see FIG. 5) of the grip belt 12, the holes 15a and 15b (see FIG. 7) of the grip belt protection member 151, and the screw holes 1m and 1n of the computer device 1 are positioned so as to correspond to each other. In addition, the holes 12f and 12g (see FIG. 5) of the grip belt 12, the holes 15a and 15b (see FIG. 7) of the grip belt protection member 152, and other screw holes (not shown) of the computer device 1 are positioned so as to correspond to each other. Next, as shown in FIG. 9B, a screw 16 is inserted through the hole 15a and the projection 15c of the grip belt protection member 151 and screwed into the screw hole 1m. In addition, another screw 16 is inserted through the hole 15b and the projection 15d of the grip belt protection member 151 and screwed into the screw hole 1n. Further, another screw 16 is inserted through the holes hole 15a and the projection 15c of the grip belt protection member 152 and screwed into the other screw hole (not shown). Moreover, another screw 16 is inserted through the hole 15b and the projection 15d of the grip belt protection member 152 and screwed into the other screw hole (not shown). By so doing, the grip belt 12 can be fixed to the back surface 1b of the computer device 1.

Due to the above, the holding member 10 can be fixed to the computer device 1 as shown in FIG. 9C.

[4. Use Mode of Holding Member 10]

The user can carry the computer device 1 with one hand by holding the hand grip 11 of the holding member 10 with the one hand.

Figure 10:
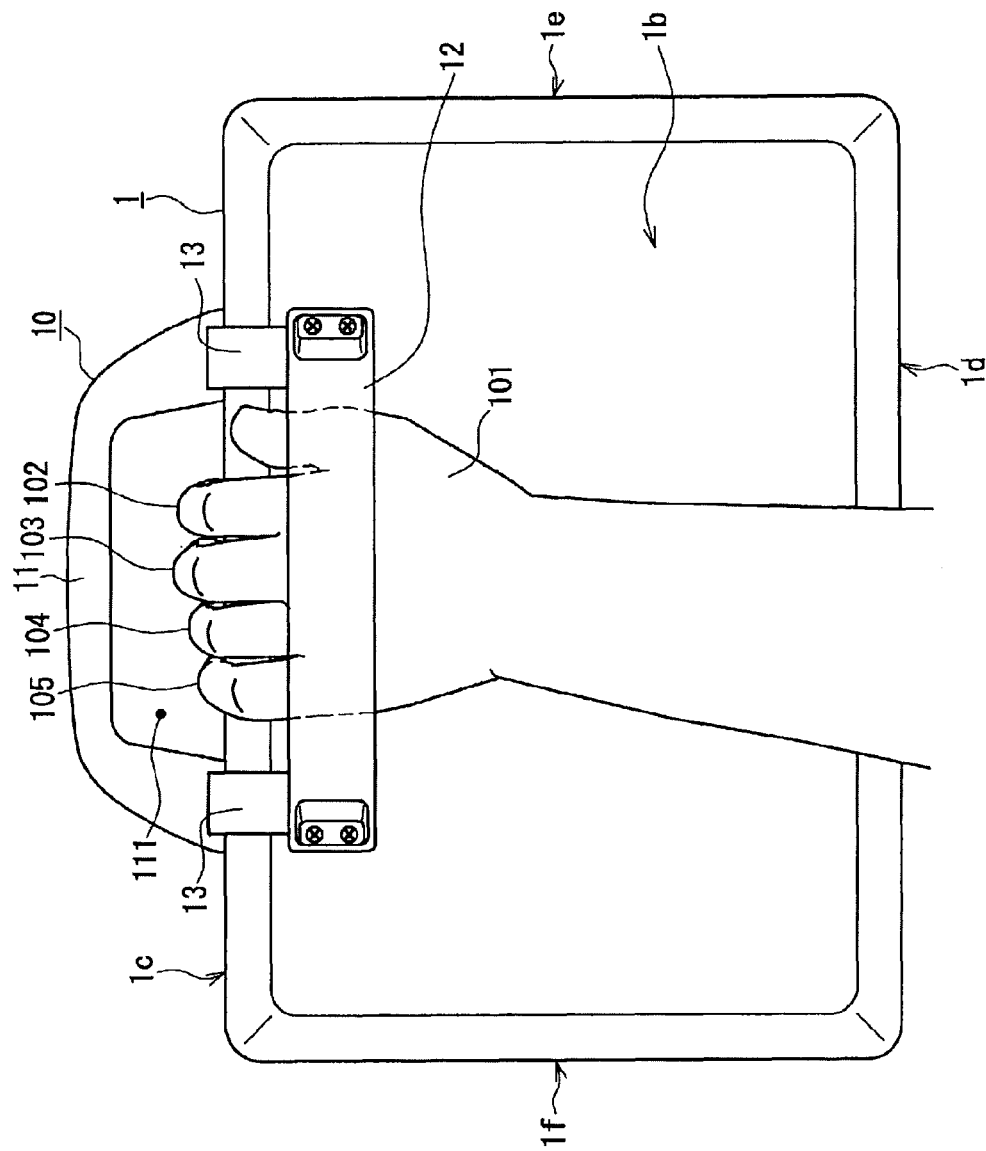
FIG. 10 is a rear view showing a state where the electronic device is held with a hand.
Figure 11:
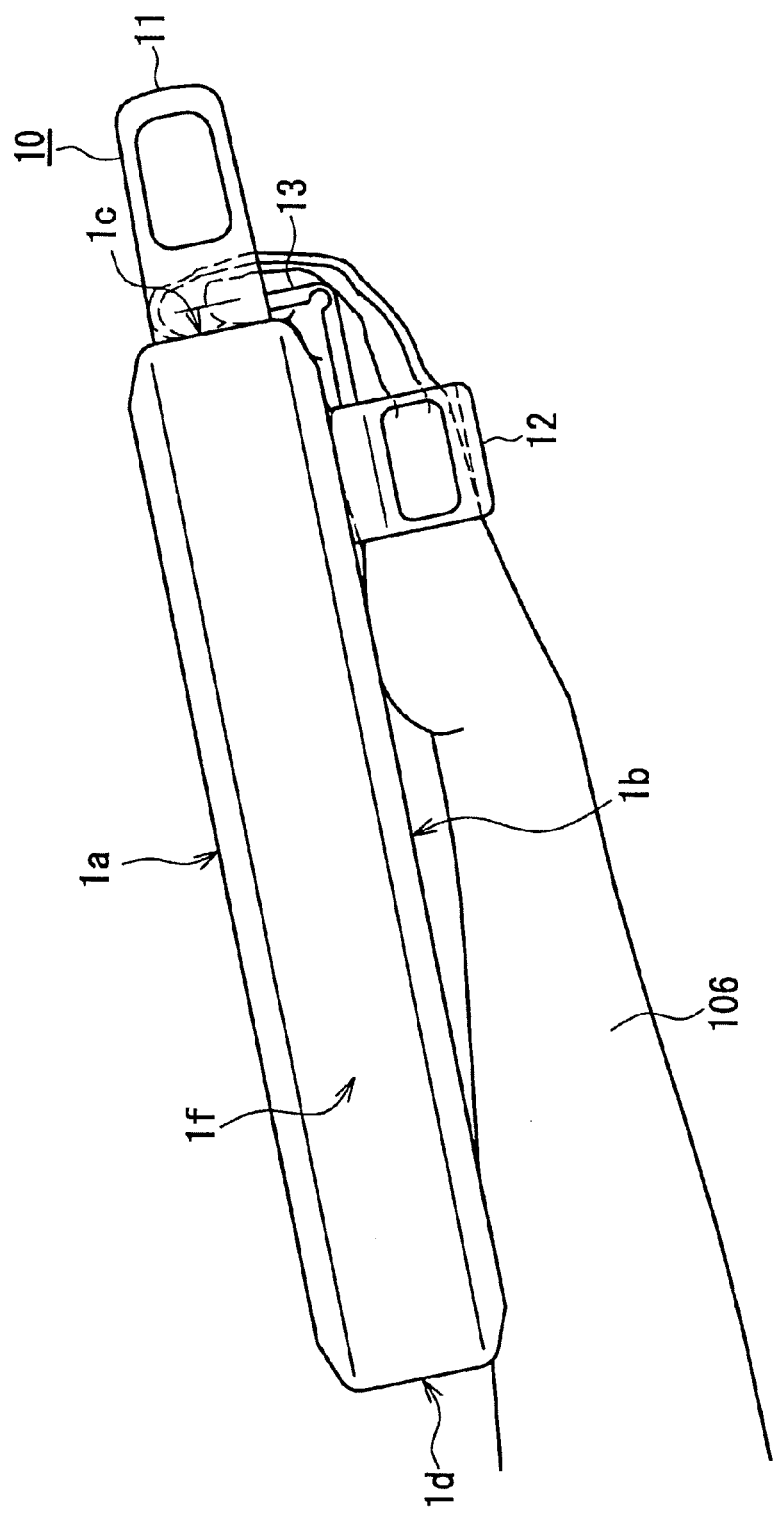
FIG. 11 is a side view showing the state where the electronic device is held with the hand.

As shown in FIGS. 10 and 11, the user can put a hand 101 (e.g., the left hand) in the void 112 (see FIG. 4) between the grip belt 12 and the computer device 1. In addition, the user inserts the second finger 102, the third finger 103, the fourth finger 104, and the fifth finger 105 of the hand 101 through the void 112 between the back surface 1b of the computer device 1 and the grip belt 12 and hooks these fingers on the top surface 1c of the computer device 1, whereby the attitude of the computer device 1 with respect to the hand 101 is stabilized. Moreover, as shown in FIG. 11, the user brings an arm 106 into contact with the back surface 1b of the computer device 1, and brings the back of the hand at the arm 106 into contact with the back surface 1b side of the belt portion 12a, whereby the attitude of the computer device 1 with respect to the arm 106 is stabilized.

Figure 12:
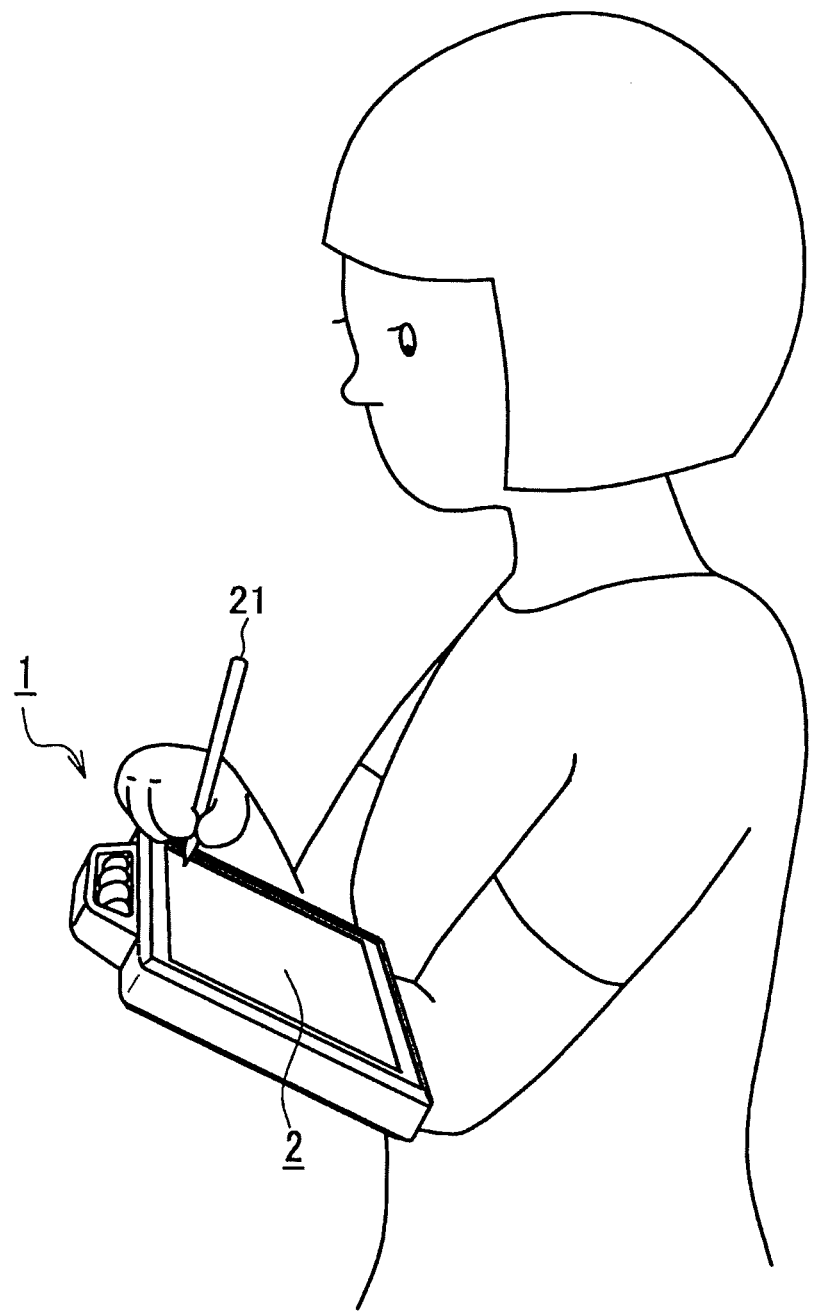
FIG. 12 is a perspective view showing the state where the electronic device is held with the hand.

By so doing, as shown in FIG. 12, the user can support the computer device 1 with one hand (e.g., the left hand). In addition, as shown in FIG. 12, while supporting the computer device 1 with one hand (e.g., the left hand), the user can hold a stylus pen 21 with the right hand. The user can input various information by touching the display panel 2 (in the case of including a touch panel) with a pointed end of the stylus pen 21. It should be noted that the configuration shown in FIG. 12 is in the case where the user who operates the computer device 1 is a right-handed user, but in the case of a left-handed user as well, merely the right and left are inverted, and the operation on the computer device 1 is the same.

Figure 13:
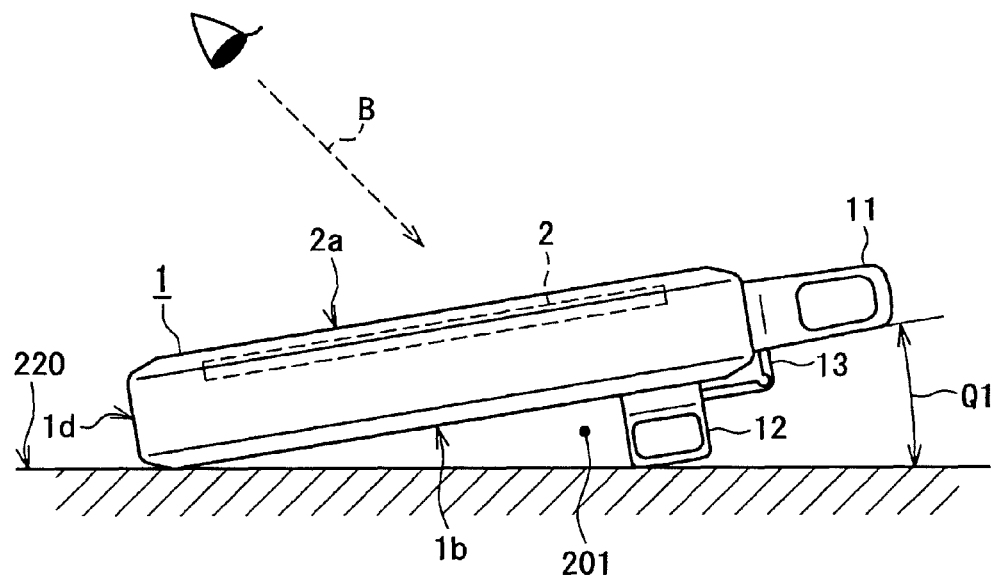
FIG. 13 is a side view showing a state where the electronic device is placed on a flat placement surface.

Further, the computer device 1 of the present embodiment can be placed on a flat placement surface 200 as shown in FIG. 13. Since the computer device 1 includes the grip belt 12 on the back surface 1b, when the computer device 1 is placed in such an attitude that the back surface 1b faces the flat placement surface 200 as shown in FIG. 13, the grip belt 12 and the vicinity of the boundary between the back surface 1b and the bottom surface 1d come into contact with the flat placement surface 200. Thus, the computer device 1 is placed so as to be tilted at an angle Q1 relative to the flat placement surface 200, and a display surface 2a of the display panel 2 can be tilted relative to the flat placement surface 200. This makes it easy for the user to view the display panel 2.

Embodiment 2

[1. Schematic Configuration of Electronic Device and Holding Device]

Figure 14:
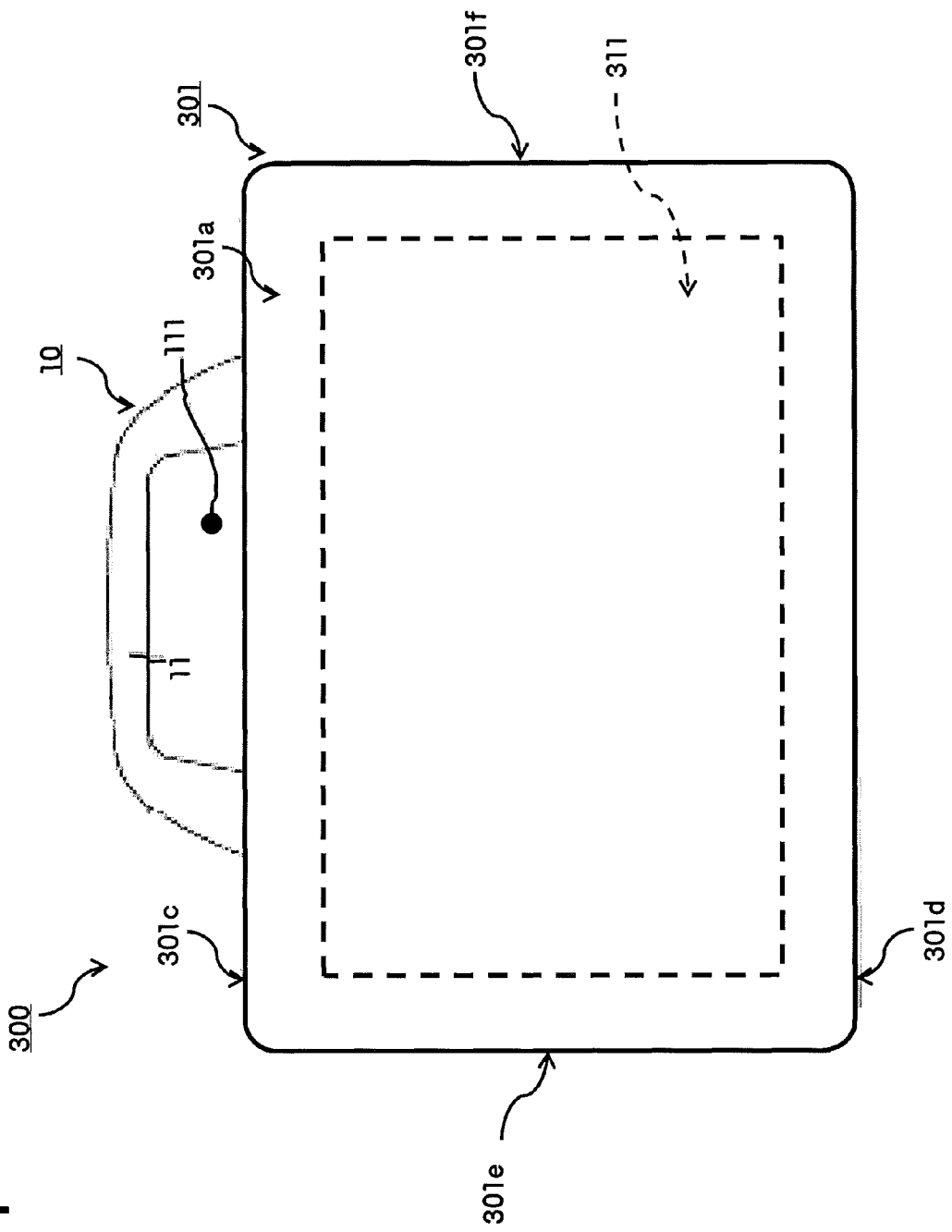
FIG. 14 is a front view of an electronic device including a holding device according to an embodiment.
Figure 15:
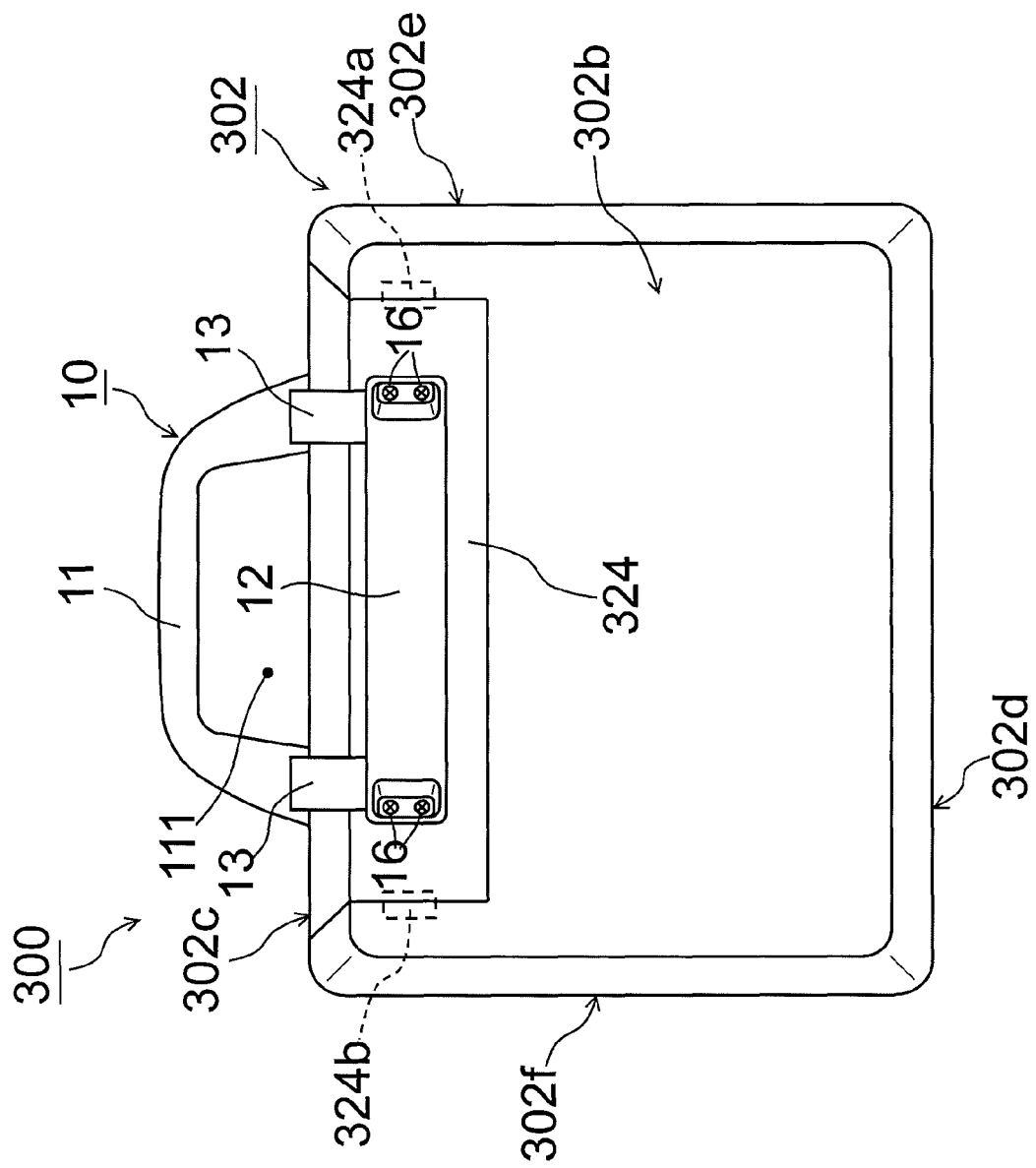
FIG. 15 is a rear view of the electronic device including the holding device according to the embodiment.
Figure 16:
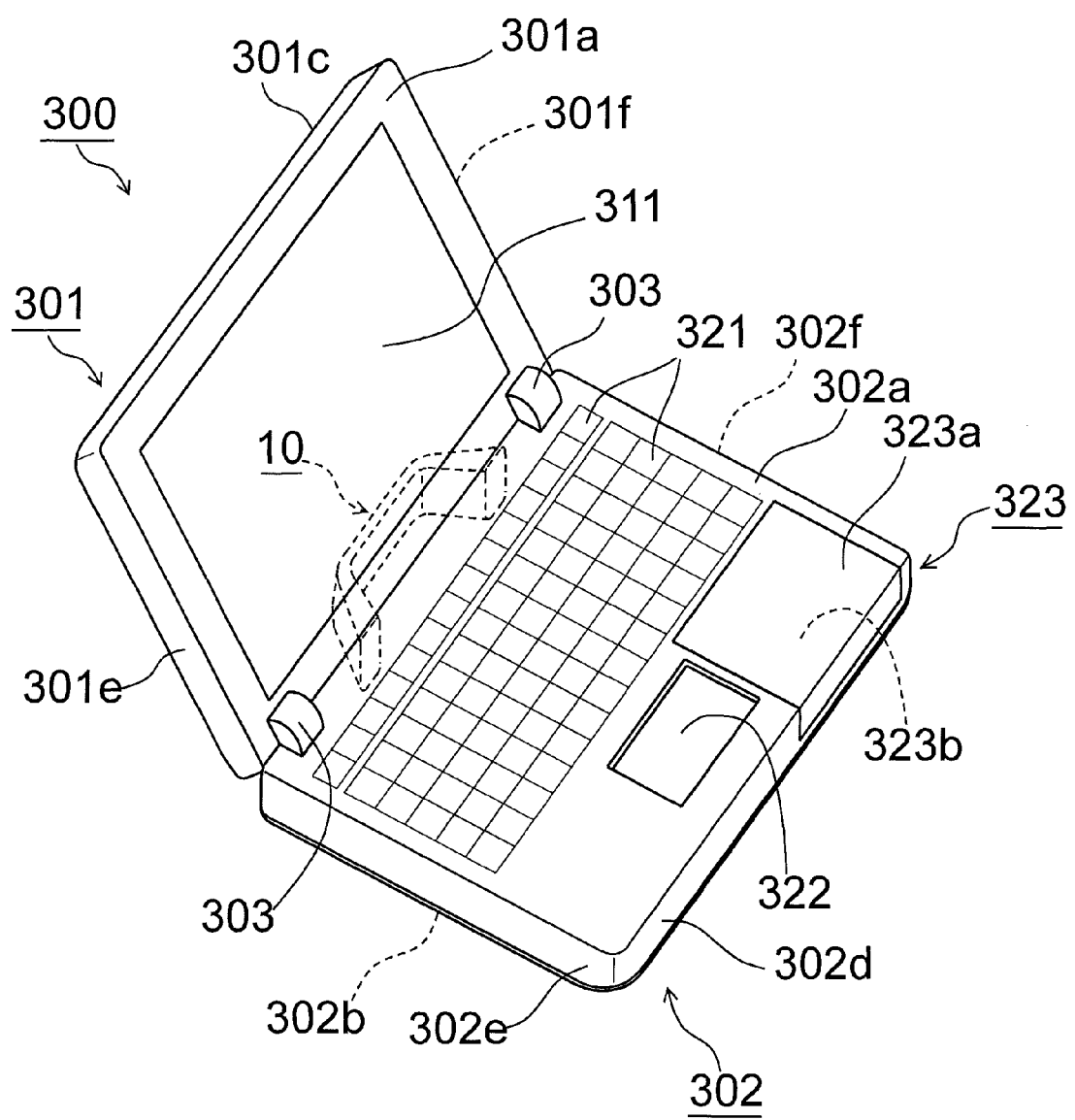
FIG. 16 is a perspective view of the electronic device including the holding device according to the embodiment.
Figure 17:
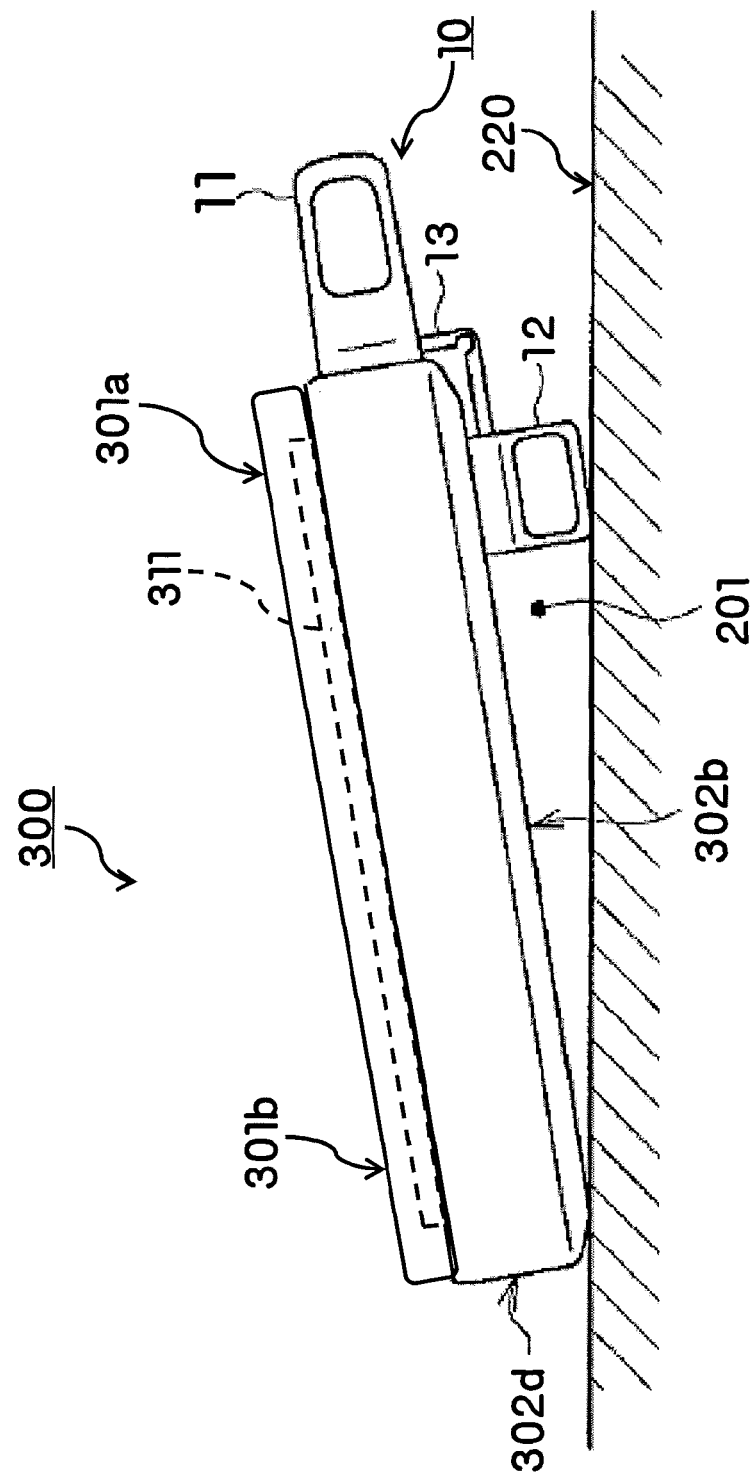
FIG. 17 is a side view of the electronic device including the holding device according to the embodiment.
Figure 18:
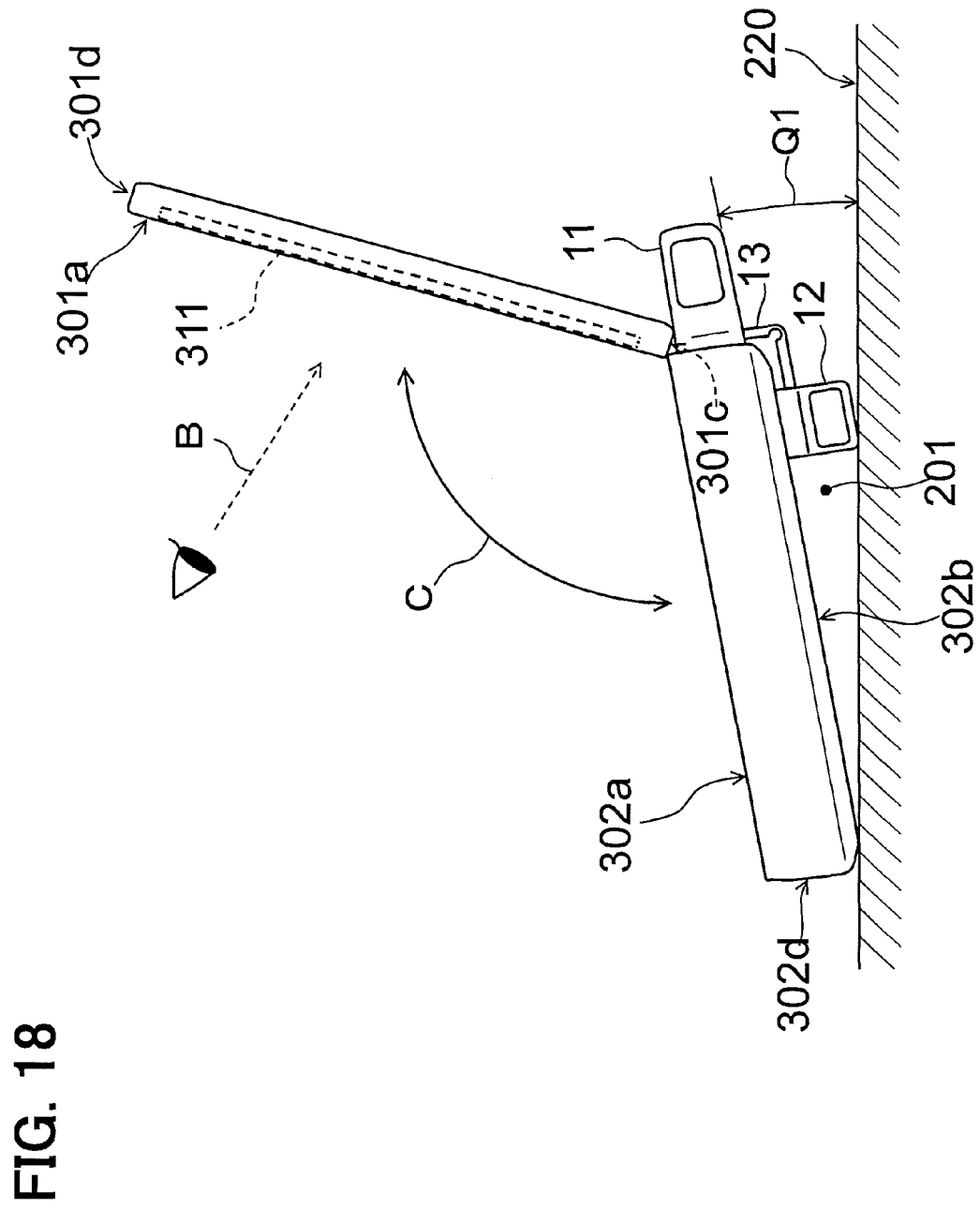
FIG. 18 is a side view of the electronic device including the holding device according to the embodiment.

FIG. 14 is a front view of a computer device 300 including a holding member 10 according to the present embodiment. FIG. 15 is a rear view of the computer device 300 including the holding member 10 according to the present embodiment. FIG. 16 is a perspective view of the computer device 300 including the holding member 10 according to the present embodiment. FIGS. 17 and 18 are side views of the computer device 300 including the holding member 10 according to the present embodiment and show states where a display housing 301 and a body housing 302 are closed and opened. The computer device 300 is an example of an electronic device that supports two housings with a hinge section such that the two housings are freely opened and closed. The holding member 10 is an example of a holding device.

The computer device 300 has a configuration in which the display housing 301 and the body housing 302 are supported with a hinge section 303 so as to be freely opened and closed.

The display housing 301 is configured as a substantially parallelepiped-shaped housing having a front surface 301a, a back surface 301b, a display top surface 301c, a display bottom surface 301d, and display side surfaces 301e (a left side surface) and 301f (a right side surface). The display housing 301 includes a display panel 311 whose display surface is disposed in the front surface 301a.

The body housing 302 is configured as a substantially parallelepiped-shaped housing having a front surface 302a, a back surface 302b, a top surface 302c, a bottom surface 302d, and side surfaces 302e (a left side surface) and 302f (a right side surface). In addition, the front surface 302a of the body housing 302 includes a keyboard 321 for inputting visual information to the display panel 311 and an operation pad 322 for performing an operation or the like on visual information displayed on the display panel 311. It should be noted that depending on a model, the front surface 302a includes a drive section 323 having a cover 323a that covers a drive body 323b. Moreover, depending on a model, the back surface 302b of the body housing 302 includes a battery cover 324 containing a secondary battery, which is not shown, and having engagement members 324a and 324b that are engaged with the back surface 302b. It should be noted that electronic components, such as a hard disk drive and a central processing unit (CPU) that perform conversion or the like of information inputted from the keyboard 321 into a video image signal that is to be displayed on the display panel 311, are disposed within the body housing 302.

Screw holes (not shown) into which screws 16 (not shown) for fixing a hand grip 11 can be screwed are formed in the top surface 302c of the body housing 302, similarly to Embodiment 1. In addition, screw holes (not shown) into which screws 16 (not shown) for fixing a grip belt 12 can be screwed are formed in the back surface 302b of the body housing 302.

The holding member 10 includes the hand grip 11, the grip belt 12, and a connection section 13. The hand grip 11 is fixed to the top surface 302c of the body housing 302. The hand grip 11 is formed in a substantially "C" shape. Thus, in a state where the hand grip 11 is fixed to the top surface 302c of the body housing 302, a void 111 is formed between the hand grip 11 and the computer device 300. The grip belt 12 is fixed to the back surface 1b of the computer device 1. The connection section 13 connects the hand grip 11 to the grip belt 12. The connection section 13 is bent or deformed in a curved manner in a state where the hand grip 11 is fixed to the top surface 302c of the body housing 302 and the grip belt 12 is fixed to the back surface 302b of the body housing 302. It should be noted that in the present embodiment, the member used in the Embodiment 1 is used as the holding member 10, and thus the specific configuration of the holding member 10 is omitted. In addition, a method for mounting onto the computer device 300 is also basically the same as that in Embodiment 1, and thus only the difference will be described.

[2. Method for Mounting Holding Member 10]

The holding member 10 is mounted onto the computer device 300 through the configurations shown in FIGS. 14 to 16. The hand grip 11 is fixed to the top surface 302c of the body housing 302. The top surface 302c is on a side where the body housing 302 and the display housing 301 are supported via the hinge section 303, namely, on a side where an axis for opening and closing the body housing 302 and the display housing 301 is located, as shown in FIGS. 14 and 15, and the hand grip 11 is screw-connected thereto by means of the screws 16 which are not shown. In addition, the grip belt 12 is screw-connected to the back surface 302b of the body housing 302 by means of the screws 16. Thus, for example, when the computer device 300 is carried in a non-operating state or the like, the hand grip 11 fixed to the top surface 302c on the hinge section 303 side is held with a hand. In addition, for example, when the computer device 300 is supported with a hand of the user in an operating state, the hand of the user is inserted through a void (not shown) between the grip belt 12 and the back surface 302b such that the back of the hand is located on the grip belt 12 side, and the computer device 300 is operated.

[3. Use Mode of Holding Member 10]

The user can carry the computer device 300 with one hand by holding the hand grip 11 of the holding member 10 with the one hand.

In addition, the user can place the computer device 300, for example, on a flat surface 220 (see FIG. 18) of a desk or the like and operate the computer device 300. In this case, as shown in FIG. 17, a void 201 can be formed with respect to the grip belt 12 by using a location where the grip belt 12 is fixed to the back surface 302b. It should be noted that when the user places the computer device 300 on the flat surface 220 and operates the computer device 300, the user views the display bottom surface 301d of the display housing 301 as the upper side as shown in FIG. 18. Since the grip belt 12 has the void 201 between the grip belt 12 and the flat surface, the computer device 300 can be tilted. Thus, the computer device 300 can have improved key operability of the keyboard 321 (see FIG. 16) and improved operability of the operation pad 322 (see FIG. 16) as shown in FIG. 18. Further, the user holds the computer device 300 such that the cover 323a faces downward. Thus, for example, when a drink or like is accidentally spilled during operation of the computer device 300 and there is the possibility that the drink will enter the drive section 323, entry of a liquid such as the drink into the drive body 323b can be suppressed by only holding the hand grip 11 with a hand and lifting the computer device 300.

Figure 19:
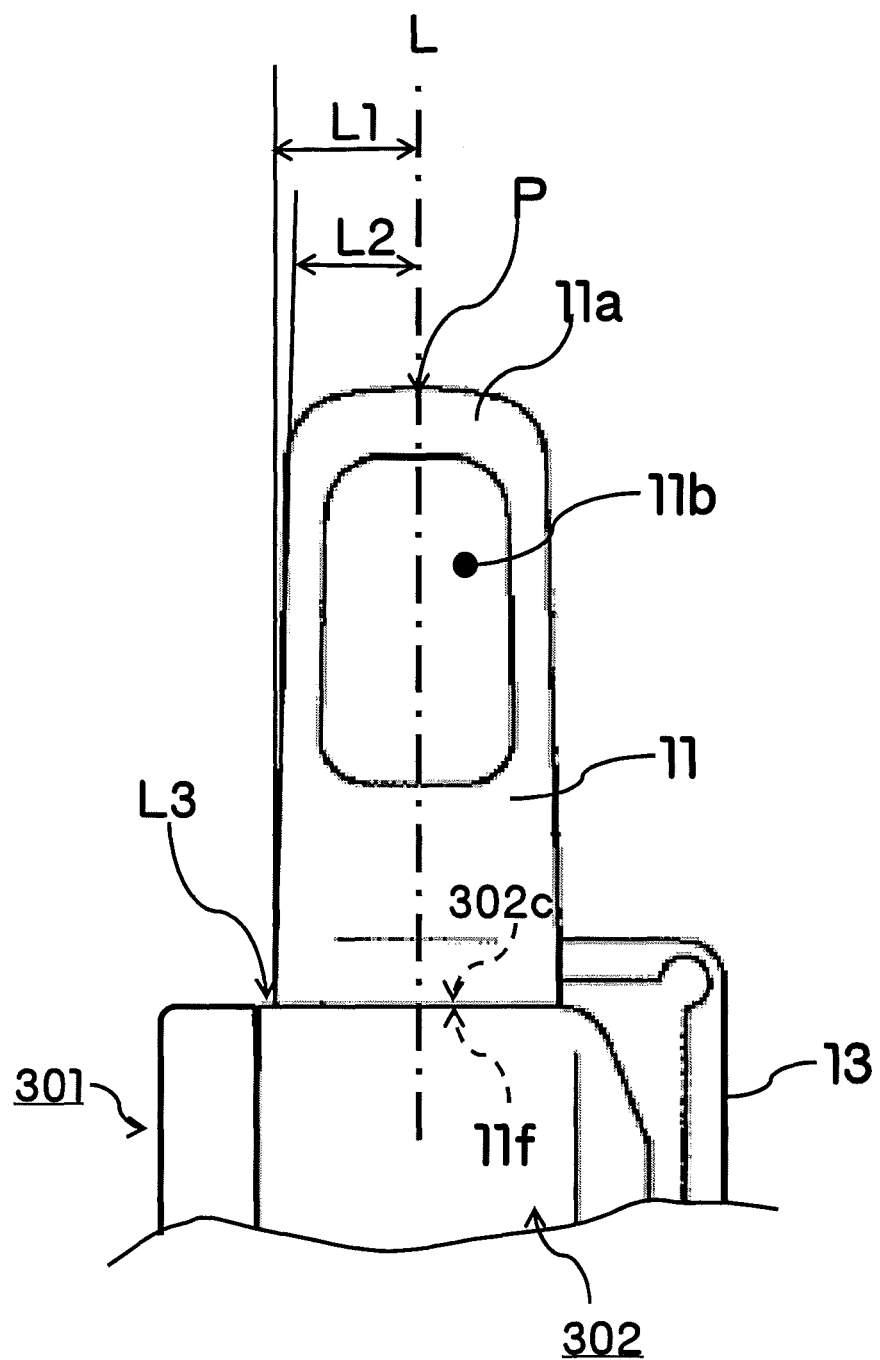
FIG. 19 is an enlarged side view of a principal portion of the electronic device including the holding device according to the embodiment.

In a state where the hand grip 11 is fixed to the top surface 302c, the position of the hand grip 11 in the computer device 300 is in a relation shown in FIG. 19. In other words, the hand grip 11 is fixedly attached to the top surface 302c. Where the distance from a center line L to the display housing 301 side on a bottom surface 11f fixedly attached to the top surface 302c is L1 and the distance from a central point P opposite to the bottom surface 11f to the display housing 301 side on the opening side of a recess 11b in the holding portion 11a is L2, the hand grip 11 provided in a standing manner on the top surface 302c is configured such that L1 is longer than L2 as shown in FIG. 19. Thus, when the display housing 301 is opened relative to the body housing 302 via the hinge section 303 (see FIG. 16), the user can set the display panel 311 at such an inner angle C that it is easy to view the display panel 311, as shown in FIG. 18. Moreover, the computer device 300 has a step L3 at the body housing 302 and on the display housing 301 side of the top surface 302c as shown in FIG. 19. Thus, since the display housing 301 has the step L3, the angle C at which the display housing 301 is opened relative to the body housing 302 can be further increased.

It should be noted that when the display housing 301 is brought into contact with the top surface 302c of the body housing 302 or the hand grip 11, there is the possibility that the open angle C will be limited. However, the open angle C can be adjusted by the difference between the above distances L1 and L2 and/or the step L3, and the configuration shown in FIG. 18 can be achieved. The open angle C can be adjusted by using singly or combining, as necessary, a configuration in which the hand grip 11 is made thin with respect to the thicknesses of the body housing 302 at the display top surface 301c and the display bottom surface 301d, a configuration in which the step L3 is made long, a configuration in which the open/close radius of the hinge section 303 is made large, or the like.

Other use modes of the computer device 300 including the holding member 10 are the same as those in Embodiment 1 described above.

It should be noted that the computer device 300 may include a battery box (not shown) containing a driving battery, adjacently to the hinge section 303 of the back surface 302b. In the computer device 300 shown in FIG. 15, the grip belt 12 is screw-connected to the battery cover 324 covering the battery box (not shown), by means of screws 16. The battery cover 324 is engaged at the engagement members 324a and 324b with the back surface 302b. The user can replace a battery, which is not shown, by releasing the engagement of the engagement members 324a and 324b. In addition, in battery replacement, after releasing the engagement members 324a and 324b, the user can deform the connection section 13, can remove the battery cover 324 from the back surface 302b, and can replace the battery. It should be noted that the above description is related to the case where the battery box is formed along the hinge section 303 which supports the display housing 301 and the body housing 302 such that the display housing 301 and the body housing 302 are freely opened and closed. When the holding member 10 is formed in a site that is not engaged with the battery cover, the holding member 10 and the battery cover 324 exhibit behaviors independent of each other.

Advantageous Effects of Embodiments and Others

The advantageous effects described in Embodiments 1 and 2 and modified examples are as follows. It should be noted that among the following descriptions, descriptions in which an embodiment number is not specified are common with Embodiments 1 and 2.

According to the present embodiment, since the holding member 10 includes the hand grip 11, the user can carry the computer device 1 with one hand.

According to Embodiment 1, since the holding member 10 includes the grip belt 12, the user can hold the computer device 1 with one hand in such an attitude that the user can view a video image displayed on the display panel 2.

According to Embodiment 2, since the grip belt 12 of the holding member 10 is provided on the back surface 302 and the hand grip 11 of the holding member 10 is provided adjacently to the hinge section 303, the user can support the display housing 301 and the body housing 302 at the hinge section 303, and can operate the keyboard 321 or the operation pad 322 with one hand while ensuring holding stability of the computer device 300 with the other hand.

According to Embodiment 2, since the hand grip 11 is provided on the top surface 302c in which the hinge section 303 having highest strength is disposed, the holding member 10 can assuredly be fixed to the computer device 300.

According to the present embodiment, since the hand grip 11 and the grip belt 12 are connected to each other via the connection section 13 to be integrally formed, the number of parts for the holding member 10 can be reduced and management of parts becomes easy. In addition, since the hand grip 11, the grip belt 12, and the connection section 13 are integrally formed, the cost of parts and the cost of molds at molding of the holding member 10 can be reduced. The case where the hand grip 11, the grip belt 12, and the connection section 13 are integrally formed has been described in the present embodiment. However, the hand grip 11 and the grip belt 12 can be produced by two-color molding or the like in which a metallic material is used as a core and an elastically deformable member can be applied at positions where a hand touches or an elastomeric resin material is applied to a surface where a hand of the user touches.

According to Embodiment 1, since the grip belt 12 is disposed on the back surface 1b of the computer device 1 and in a position close to the top surface 1c, the computer device 1 can be placed on a flat placement surface in a tilted attitude. Thus, the display surface 2a of the display panel 2 faces toward the user who faces the computer device 1, and hence the user easily views the display surface 2a of the display panel 2.

According to Embodiment 2, since the holding member 10 is disposed parallel to a hinge shaft of the hinge section 303 with which the display housing 301 and the body housing 302 are rotatably engaged, when the computer device 300 is placed on a flat surface, the body housing 302 is tilted by a portion of the grip belt 12 which is fixed to the back surface 1b, and, for example, the user can easily perform a key operation on the keyboard 321 disposed in the body housing 302.

According to Embodiment 2, for example, in the case where the computer device 300 includes the drive section 323, the user holds the hand grip 11 such that the drive body 323b is located on the lower side. By so doing, entry of water drops into the drive body 323b due to carelessness, an operation in rain, or the like can be suppressed.

According to the present embodiment, due to the configuration in which the hand grip protection member 14 is disposed in the recess 11b or 11c of the hand grip 11, the hand grip 11 and the screws 16 for fixing the hand grip 11 to the computer device 1 or 300 can be separated from each other. Thus, damage caused by the heads of the screws 16 being buried into, for example, the inner surfaces of the recesses 11b and 11c or the holes 11d and 11e of the hand grip 11 can be prevented, whereby the hand grip 11 can be protected from the heads of the screws 16. However, when the hand grip 11 is produced by two-color molding as described above, merely the holes 11d and 11e provided in the recesses 11b and 11c are formed in the core metal material, and the heads of the screws 16 can be prevented from being buried into the hand grip 11. Therefore, the hand grip protection member 14 can be omitted.

According to the present embodiment, due to the configuration in which the grip belt protection member 15 is disposed in the recess 12b or 12c of the grip belt 12, the grip belt 12 and the screws 16 for fixing the grip belt 12 to the computer device 1 or 300 can be separated from each other. Thus, damage caused by the heads of the screws 16 being buried into, for example, the inner surfaces of the recesses 12b and 12c or the holes 12d and 12e of the grip belt 12 can be prevented, and the grip belt 12 can be supported by screwing the heads of the screws 16 into the screw holes 1m and 1n provided in the back surface 1b of the computer device 1. In addition, since the outer shape of the grip belt protection member 15 is basically a rectangular column, for example, even when the screw 16 is screwed into the hole 15a, the grip belt protection member 15 does not rotate along the back surface 1b or 302b. Further, since the grip belt protection member 15 includes the groove 15g and a projection provided in the bottom surface 12m is fitted into the groove 15g, for example, even when the screw 16 is screwed into the hole 15a, the grip belt protection member 15 does not rotate along the back surface 1b or 302b. Moreover, in the present embodiment, since the grip belt protection member 15 is screw-connected by means of the two screws 16, rotation of the grip belt protection member 15 can also be suppressed regardless of the outer shape of the grip belt protection member 15. It should be noted that when the grip belt 12 is produced by two-color molding as described above, the holding member 10 can omit the grip belt protection member 15.

In the present embodiment, the holding member 10 is integrally formed from a single material, but may be integrally formed from a plurality of materials. For example, the hand grip 11 and the grip belt 12 may be formed from hard resin such as polyacetal resin, and the connection section 13 may be formed from silicone rubber or the like.

In the present embodiment, the hand grip 11 is fixed to the top surface 1c or 301c of the computer device 1 or 300, but may be fixed to another surface. In addition, the grip belt 12 is fixed to the back surface 1b or 301b of the computer device 1 or 300, but may be fixed to another surface such as the back surface 301b of the display housing 301 in the case of the computer device 300. Regarding the holding member 10, at least the hand grip 11 and the grip belt 12 may be integrally formed and fixed to an electronic device such as the computer devices 1 and 300.

In the present embodiment, the hand grip 11 and the grip belt 12 are adjacently fixed to two surfaces, respectively, adjacent to each other in the computer device 1 or 300. However, although the connection section 13 is lengthened, the direction in which the grip belt 12 is fixed to the back surface 302b in FIG. 17 may be inverted and the hand grip 11 may be fixed to the bottom surface 302d.

In the present embodiment, each of the hand grip 11 and the grip belt 12 is formed in a substantially "C" shape, but may be formed in a closed shape in which a portion facing the computer device 1 is not opened, such as an "O" shape or a hollow rectangular shape.

In the present embodiment, the use examples where the hand grip 11 is used when the computer device 1 or 300 is carried and the grip belt 12 is used when the computer device 1 or 300 is operated have been described. However, these use examples are arbitrary. For example, the user can also operate the computer device 1 or 300 while holding the hand grip 11, or the user can also hold the grip belt 12 with a hand and can carry the computer device 1 or 300.

The regions where the screw holes 1g are formed in the top surface 1c or 301c of the computer device 1 or 300 may include recesses into which the bottom surfaces 11f and 11g of the hand grip 11 are fitted. With such a configuration, the hand grip 11 can assuredly be positioned with respect to the computer device 1 or 300. In addition, even when the regions where the screw holes 1g are formed in the top surface 1c or 301c of the computer device 1 or 300 include projections and the bottom surfaces 11f and 11g of the hand grip 11 include recesses into which the projections are fitted, the same advantageous effect is obtained.

The regions where the screw holes 1m and 1n are formed in the back surface 1b or 301b of the computer device 1 or 300 may include recesses into which the bottom surfaces 12m and 12h of the grip belt 12 can be fitted. With such a configuration, the grip belt 12 can assuredly be positioned with respect to the computer device 1 or 300. In addition, even when the regions where the screw holes 1m and 1n are formed in the back surface 1b or 301b of the computer device 1 or 300 include projections and the bottom surfaces 12m and 12h of the grip belt 12 include recesses into which the projections can be fitted, the same advantageous effect is obtained.

In the present embodiment, the holding member 10 is fixed to the computer device 1 or 300 by means of the screws 16, but the fixing method is not limited to the screw connection by means of screws. For example, the projection 14b of the hand grip protection member 14 is formed into such a shape that the projection 14b can be inserted through each of the holes 11d and 11e of the hand grip 11, and a claw portion is provided at a pointed end thereof. For example, when the claw portion is configured to be engaged with a hole formed in the top surface 1c or 301c of the computer device 1 or 300, the hand grip 11 can be fixed to the top surface 1c or 301c of the computer device 1 or 300 without using the screws 16. It should be noted that the method using claw engagement can be similarly used as a method for fixing the grip belt 12. In addition, the holding member 10 may be adhesively fixed to the computer device 1 or 300.

According to the present embodiment, the holding member 10 including integrally the hand grip 11 and the grip belt 12 is fixed to the computer device 1 or 300. However, when only either of the hand grip 11 or the grip belt 12 is provided in the computer device 1 or 300, the hand grip 11 and the grip belt 12 can be produced as single items, for example, by cutting the thin portion 13c of the connection section 13 in the produced holding member 10. In the present embodiment, the holding member 10 is formed from a flexible material such as silicone rubber, and thus can be easily cut with a cutter knife or the like.

Next, a modified example for the present embodiment described above will be described. The present modified example will be described with the computer device 1 as an example of an electronic device, but is the same with another electronic device such as the computer device 300.

Figure 20:
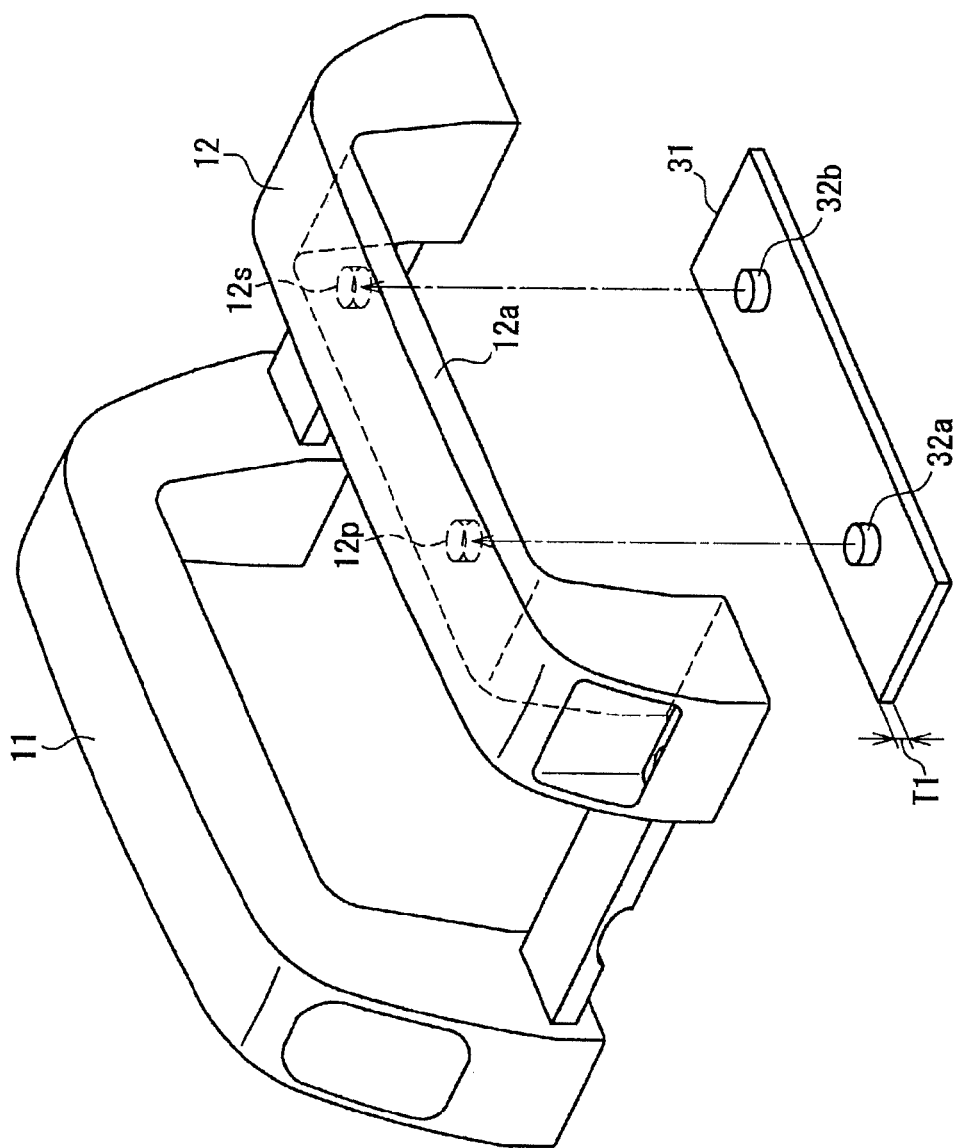
FIG. 20 is a perspective view showing a modified example of a holding device.

As shown in FIG. 20, the belt portion 12a of the grip belt 12 may include holes 12p and 12s. Thus, a pad member 31 can be mounted on the grip belt 12. Specifically, a projection 32a formed on a principal flat surface of the pad member 31 is fitted into the hole 12p of the belt portion 12a, and a projection 32b formed on the principal flat surface of the pad member 31 is fitted into the hole 12s, whereby the pad member 31 can be mounted on the belt portion 12a. With such a configuration, the width dimension H3 (see FIG. 4) of the void 112 between the belt portion 12a and the back surface 1b of the computer device 1 can be adjusted to an arbitrary dimension. In other words, mounting or non-mounting of the pad member 31 can be selected depending on the thickness of a hand of the user. For example, in the case of a user having thin hands, when a hand is put in the void 112, a great gap may occur between the back of the hand and the belt portion 12a and the hand may easily come out of the void 112. In such a case, when the pad member 31 is mounted on the belt portion 12a and used, the gap between the back of the hand and the belt portion 12a can be reduced or eliminated, and the hand can be prevented from easily coming out of the void 112. It should be noted that when a plurality of types of pad members 31 having different thicknesses T1 are prepared, the width dimension H3 (see FIG. 4) of the void 112 between the pad member 31 and the back surface 1b of the computer device 1 can be adjusted to an arbitrary dimension. In addition, for the pad member 31, for example, a material called low-resilience urethane, which is plastically deformable in a reversible manner, can also be used depending on the back of the hand of the user which is to be inserted.

It should be noted that when the holding member 10 is mounted onto the computer device 1, it is difficult to correctly position the holding member 10 in some cases. For example, when the screw 16 is engaged with the screw hole 1g provided in the computer device 1 to screw-connect the hand grip 11, the hole 11d of the hand grip 11 and the screw hole 1g provided in the top surface 1c of the computer device 1 have to be seen from the recess 11b, and thus positioning is difficult. In such a case, a projection that engages a corner formed by the top surface 1c and the back surface 1b of the computer device 1 can be provided at the boundary between the connection section and the hand grip.

Figure 21:
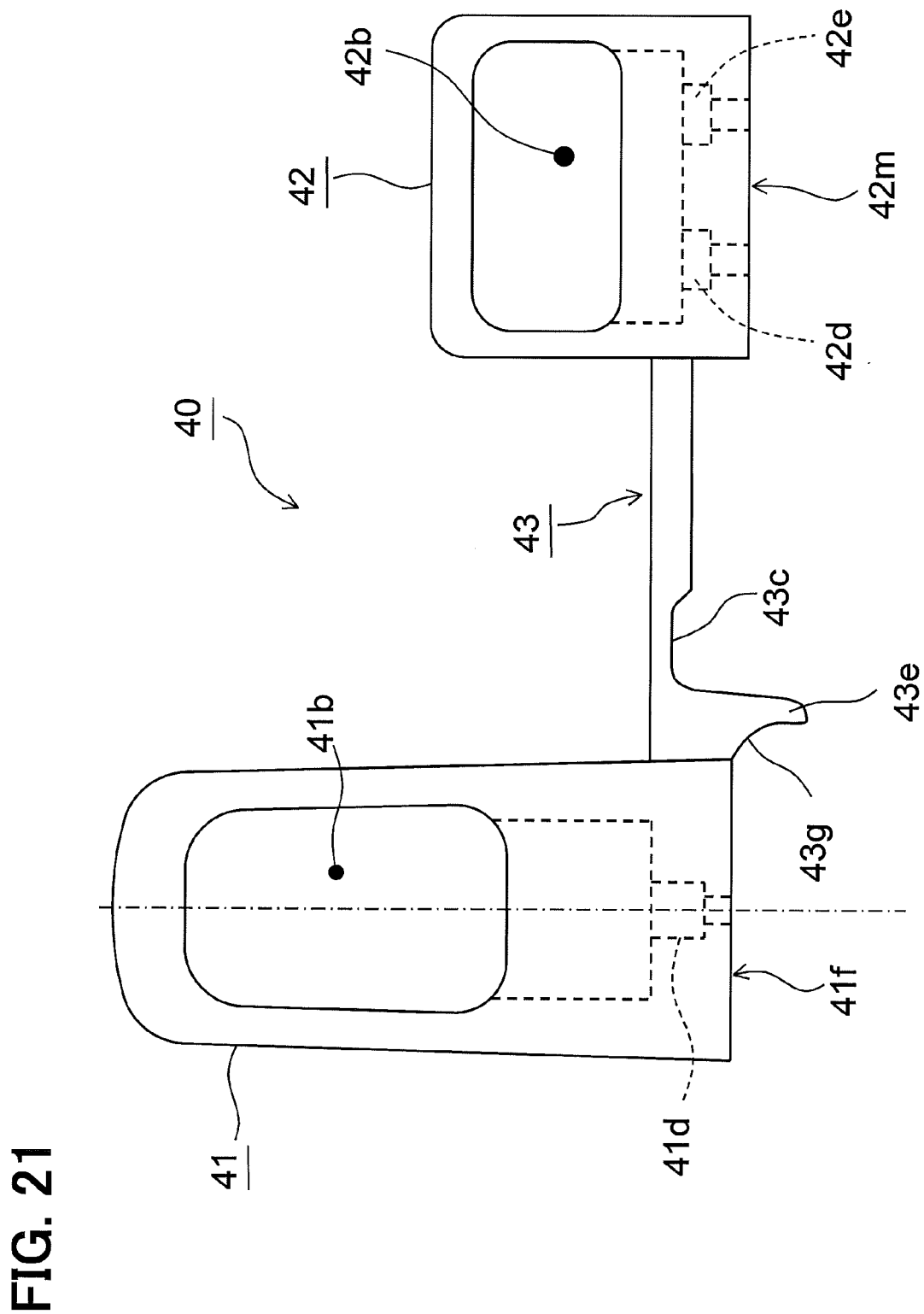
FIG. 21 is a side view showing a modified example of a holding device.
Figure 22:
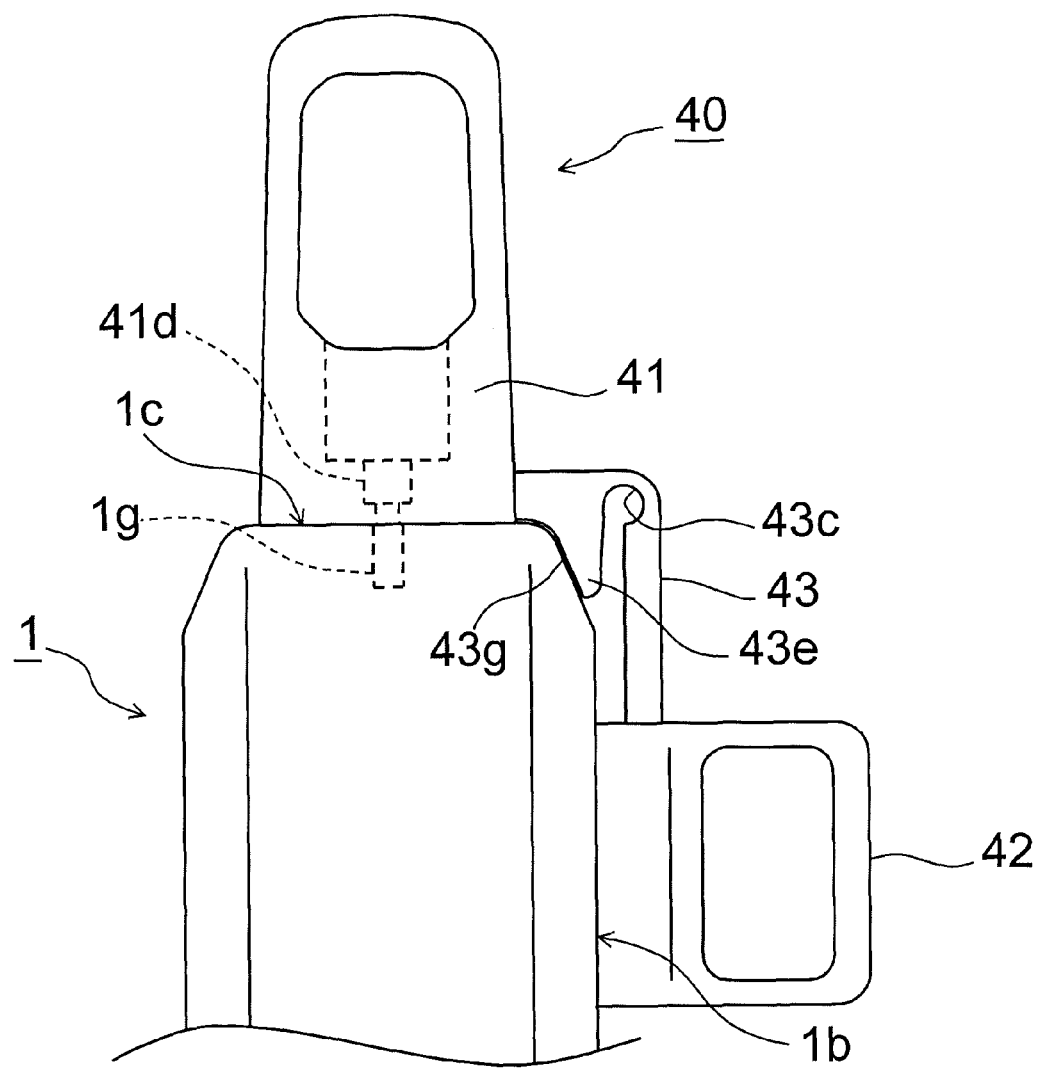
FIG. 22 is an enlarged side view of a principal portion of an electronic device on which the modified example of the holding device is mounted.

A specific example will be described with reference to FIGS. 21 and 22. FIG. 21 is a side view of a holding member 40 that has not been mounted on the computer device 1, and FIG. 22 is a side view of a principal portion of the holding member 40 that has been mounted on the computer device 1. In FIGS. 21 and 22, a hand grip 41 includes a recess 41b and a hole 41d, a grip belt 42 includes a recess 42b having holes 42d and 42e therein, and a connection section 43 includes an inclined surface 43g formed in a projection 43e projecting between the hand grip 41 and a thin portion 43c. It should be noted that in FIGS. 21 and 22, the hand grip 41, the grip belt 42, and the connection section 43 are shown only on one side thereof, but have the same configuration on the other side thereof. Further, for simplification of the drawings, for example, illustration of the hole 41d and the holes 42d and 42e is omitted, but holes are also provided similarly as in FIG. 5 and the connection section 43 also includes a first connection portion similarly as in FIG. 5.

The holding member 40 can be positioned on the right side of the sheet of the drawing shown in FIG. 22 by causing the inclined surface 43g of the projection 43e to come into contact with the corner formed by the top surface 1c and the back surface 1b of the computer device 1. The positioned hand grip 41 is screw-connected to the computer device 1 by screwing the screw 16 (not shown) into the hole 41d and the screw hole 1g. The holding member 40, which is screw-connected to the computer device 1, is mounted by bending the grip belt 42 to the back surface 1b at the thin portion 43c of the connection section 43 and screw-connecting the back surface 1b and the bottom surface 42m. In other words, in the connection section 43 mounted on the computer device 1, the inclined surface 43g that projects on the hand grip 41 side of the projection 43e is deformed along the corner formed by the top surface 1c and the back surface 1b of the computer device 1. It should be noted that the thickness of the connection section 43 increases due to inclusion of the projection 43e, and thus it is difficult to deform the connection section 43 at the projection 43e. Therefore, the surface shape of the inclined surface 43g is preferably fitted to the outer shape of the corner of the computer device 1 with which the inclined surface 43g is brought into contact. As described above, the projection 43e improves accuracy of positioning the screw 16 with respect to the hole 41d and the screw hole 1g as well as the rigidity of the connection section 43. In addition, the projection 43e in FIG. 22 has been described with the configuration in which the projection 43e is disposed so as to be continuous from the recess shape of the thin portion 43c, but suffices to be brought into contact with the corner of the mounted computer device 1, and the thin portion 43c may be separated from the projection 43c. Further, the projection 43e has been described with the configuration in which the projection 43e is disposed on the back surface 1b side in the connection section 43, but is applicable even when the projection 43e is disposed on the opposite side of the connection section 43 with respect to the hand grip 41 or on both sides of the connection section 43. It should be noted that when a projection is provided on a side of the hand grip 41 which is opposite to a direction in which the connection section 43 is disposed, the projection has to include a connection section that connects the projection to the hand grip 41.

Although only the positioning of the grip belt 42 has been described above, the projection 43e exerts an effect also when positioning the hand grip 41 and the top surface 1c. In other words, the hand grip 41 can also be positioned in the screw hole 1g of the top surface 1c by causing the inclined surface 43g of the projection 43e to come into contact with the corner formed by the top surface 1c and the back surface 1b.

Figure 23:
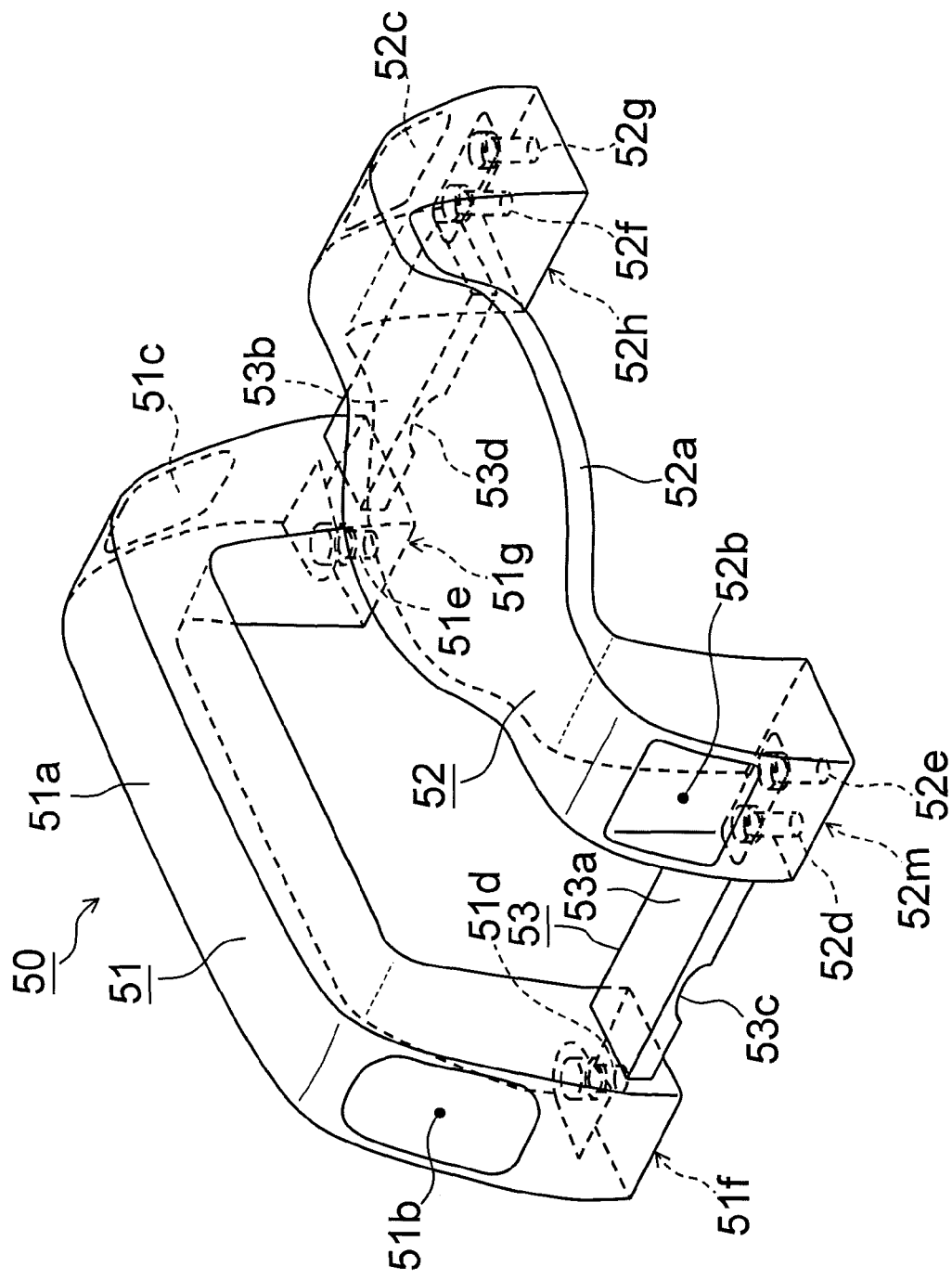
FIG. 23 is a perspective view showing a modified example of a holding device.
Figure 24:
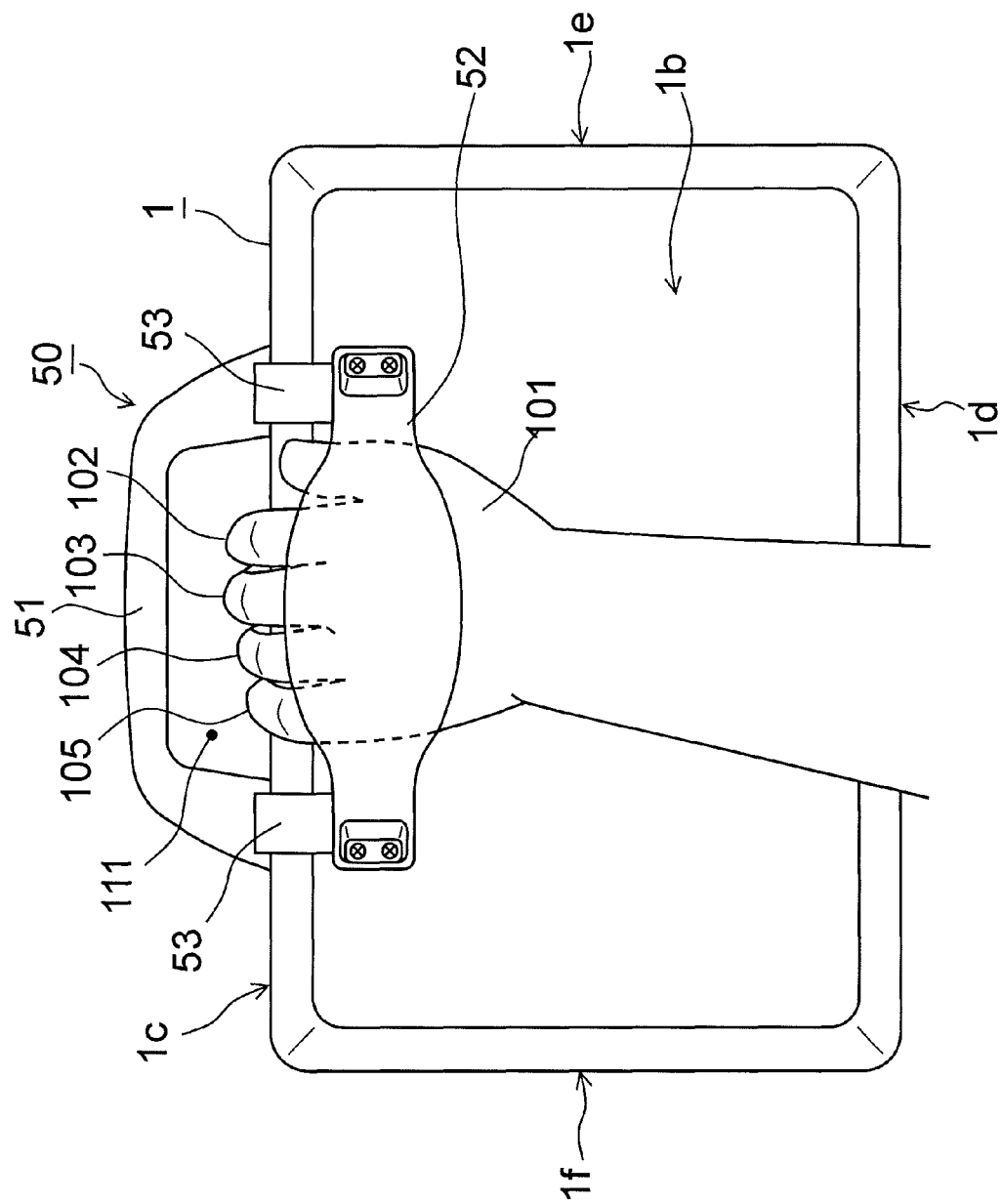
FIG. 24 is a rear view of an electronic device including the modified example of the holding device.

The example where the grip belt 12 in the embodiment described above is narrower than the width of the back of the hand in a direction in which the fingers extend has been described. However, for example, there is a case where it is difficult to support the mounted electronic device depending on the weight of the electronic device, and there is also a case where the screen is actually tilted relative to the arm when the user views the mounted electronic device while supporting the electronic device with a hand as shown in FIG. 12. Therefore, it is advantageous that the width of the grip belt 12 is large. FIGS. 23 and 24 are a perspective view showing an example of a wide grip belt 52 and a diagram when the grip belt 52 is mounted on the computer device 1.

As shown in FIGS. 23 and 24, a holding member 50 includes a hand grip 51, the grip belt 52, and a connection section 53. The hand grip 51 includes a holding portion 51a, recesses 51b and 51c, holes 51d and 51e, and bottom surfaces 51f and 51g, and they have the same configurations as that of the hand grip 11 shown in FIG. 5. In addition, the connection section 53 includes a first connection portion 53a having a thin portion 53c and a second connection portion 53b, and they also have the same configuration as that of the connection section 13 shown in FIG. 5. The grip belt 52 serves to support a hand of the user which is inserted through the gap between the grip belt 52 and the back surface 1b of the computer device 1, namely, has the same function as that of the grip belt 12 in FIG. 5. However, a belt portion 52a of the grip belt 52 differs from the belt portion 12b only in a width in a direction orthogonal to a direction in which the grip belt 52 is fixedly attached to the back surface 1b of the computer device 1. In other words, the grip belt 52 includes the belt portion 52a, recesses 52b and 52c, holes 52d, 52e, 52f, and 52g, and bottom surfaces 52m and 52h, and has the same configuration as that of the grip belt 12 in FIG. 5 except for the belt portion 52a. Thus, the protection members 14 and 15 and the like can similarly be mounted thereon.

Since the belt portion 52a is formed so as to be wider than the belt portion 12a as described above, when the user supports the computer device 1 with a hand along the back of the hand, the hand of the user can be protected further as compared to the grip belt 12. Thus, the screen of the computer device 1 can be horizontally oriented and viewed as shown in FIG. 12, and can also be vertically oriented and viewed. In addition, the belt portion 52a can cover the back of the hand of the user. Thus, the mere change of the shape of the belt portion 52a in the back surface 1b of the mounted computer device 1 allows pain in the hand inserted through the gap between the belt portion 52a and the back surface 1b to be alleviated, allows comfort when the user supports the computer device 1 to be improved, and allows a high-weight electronic device to be handled.

It should be noted that the shape of the belt portion 52a is not limited to the shape in FIGS. 23 and 24 and can be freely changed to a shape such as a configuration in which the belt portion 52a has a projection only on one side in a mounting direction with respect to the back surface 1b and a configuration in which the belt portion 52a covers the substantially entirety of the hand of the user. However, the user is not limited to a right-handed user. Thus, in order to support both right-handed and left-handed users, the widely spreading portion preferably has a shape that is symmetrical about a direction in which the grip belt 52 is fixedly attached. Further, as shown in FIG. 23, the belt portion 52a is formed so as to be thin as compared to the portions mounted onto the back surface 1b. Thus, when the back surface 1b of the computer device 1 is placed on a flat placement surface in a state where the holding member 50 is mounted on the computer device 1, the belt portion 52a can be deformed and the computer device 1 can be supported by the fixedly attached portions at two locations, which is the same as in the grip belt 12.

The holding member 10 or 40 in the present embodiment described above includes the connection section 13 or 43 that connects the hand grip 11 or 41 to the grip belt 12 or 42. Thus, since the connection section 13 or 43 is connected to the grip belt 12 or 42, drop of the computer device 1 or 300, for example, when the connection between the top surface 1c or 302c and the hand grip 11 or 41 is released in a state where the holding member 10 or 40 is mounted on the computer device 1 or 300 can be suppressed, and damage of the computer device 1 or 300 can be suppressed. In addition, the same applies to the case where the connection between the back surface 1b or 301b and the grip belt 12 or 42 is released.

The computer device 1 or 300 in the present embodiment is an example of an electronic device. The holding member 10 is an example of a holding device. The hand grip 11, 41, or 51 is an example of a first holding section. The grip belt 12, 42, or 52 is an example of a second holding section. The hand grip 11, 41, or 51 and the grip belt 12, 42, or 52 are an example of a plurality of holding sections. The connection section 13, 43, or 53 is an example of a connection section. The thin portion 13c, 43c, or 53c is an example of a thin portion. The recess 11b, 11c, 41b, 51b, 12b, 12c, 42b, or 52b is an example of a recess. The hand grip protection member 14 is an example of a first protection member. The grip belt protection member 15 is an example of a second protection member.

What is claimed is:

1. A holding device comprising:
   a plurality of holding sections each including a recess or an opening through which a hand of a user can be inserted; and
   a connection section connecting the plurality of holding sections to each other, wherein the plurality of holding sections includes
      a first holding section that can be held by the user with a hand, and
      a second holding section that supports the back side of the hand of the user.

2. The holding device according to claim 1, wherein the plurality of holding sections and the connection section are formed from the same material.

3. The holding device according to claim 1, wherein
   the first holding section has recesses formed in both ends thereof in a longitudinal direction, and
   the holding device further comprises first protection members fitted in the recesses.

4. The holding device according to claim 1, wherein
   the second holding section has recesses formed in both ends thereof in a longitudinal direction, and
   the holding device further comprises second protection members fitted in the recesses.

5. The holding device according to claim 1, wherein the connection section includes a thin portion.

6. The holding device according to claim 1, wherein the first holding section includes a projection that projects from a boundary surface in a boundary region where the connection section is formed from the first holding section, on a side opposite to a projection direction in which the first holding section is formed in a standing manner.

7. An electronic device comprising:
   a housing having opposing front and back sides defining respective first and second surfaces, and a lateral side, defining a third surface, interconnecting the first and second surfaces while leaving a gap between them;
   a display section disposed in the first surface of the housing and capable of displaying a video image; and
   a holding device fixed to the housing, the holding device comprising
      a plurality of holding sections each including a recess or an opening through which a hand of a user can be inserted, and
      a connection section connecting the plurality of holding sections to each other, wherein
   a first holding section among the plurality of holding sections is fixed to the third surface of the housing and can be held by a user's hand, and a second holding section among the plurality of holding sections is fixed to the second surface of the housing and supports the back side of the user's hand.

8. The electronic device according to claim 7, wherein the second holding section is fixed to a vicinity of an edge constituting a boundary between the second surface and the third surface.

9. The electronic device according to claim 7, wherein when the display section is placed in such an orientation that a displayed video image is viewed, a site that fixes the second holding section to the second surface tilts the housing.

10. The electronic device according to claim 7, wherein the first holding section includes a projection that projects from a boundary surface in a boundary region where the connection section is formed from the first holding section, on a side opposite to a projection direction in which the first holding section is formed in a standing manner, in a state where the first holding section is fixed to the third surface.

11. An electronic device comprising:
   a display housing in which a display section for displaying a video image is disposed;
   a body housing having opposing front and back sides defining respective first and second surfaces, and lateral sides, defining a third surface, interconnecting the first and second surfaces while leaving a gap between them;
   an operation section, disposed in the first surface of the body housing, for operating a video image signal displayed on the display section;
   a hinge section having a rotating shaft, along one of the lateral sides of the body housing, that rotatably supports the display housing and the body housing; and
   a holding device fixed to the body housing, the holding device comprising
      a plurality of holding sections each including a recess or an opening through which a hand of a user can be inserted, and
      a connection section that connects the first holding section to the second holding section along a direction of the rotating shaft, wherein
   the plurality of holding sections includes
      a first holding section that is disposed on the third surface and alongside where the rotating shaft is present, and that can be held by a user's hand;
      a second holding section that is disposed on the second surface and that supports the back of the user's hand.

12. The electronic device according to claim 11, wherein the second holding section is fixed to a vicinity of an edge constituting a boundary between the second surface and the third surface.

13. The electronic device according to claim 11, wherein when the display section is placed in such an orientation that a displayed video image is viewed, a site that fixes the second holding section to the second surface tilts the body housing.

14. The electronic device according to claim 11, wherein the first holding section includes a projection that projects from a boundary surface in a boundary region where the connection section is formed from the first holding section, on a side opposite to a projection direction in which the first holding section is formed in a standing manner, in a state where the first holding section is fixed to the third surface.

* * * * *